(12) United States Patent
Yamakage et al.

(10) Patent No.: US 12,169,354 B2
(45) Date of Patent: Dec. 17, 2024

(54) PROJECTION-TYPE DISPLAY DEVICE

(71) Applicant: Light Show Technology Co., LTD., Tokyo (JP)

(72) Inventors: Akihiro Yamakage, Tokyo (JP); Atsushi Kato, Tokyo (JP); Yufei Mei, Tokyo (JP)

(73) Assignee: LIGHT SHOW TECHNOLOGY CO., LTD., Tokyo (JP)

( * ) Notice: Subject to any disclaimer, the term of this patent is extended or adjusted under 35 U.S.C. 154(b) by 0 days.

(21) Appl. No.: 18/508,463

(22) Filed: Nov. 14, 2023

(65) Prior Publication Data
US 2024/0168367 A1    May 23, 2024

(30) Foreign Application Priority Data

Nov. 22, 2022  (JP) ................................ 2022-186819
Apr. 3, 2023   (JP) ................................ 2023-060364

(51) Int. Cl.
G03B 21/20         (2006.01)
(52) U.S. Cl.
CPC ....... *G03B 21/208* (2013.01); *G03B 21/2013* (2013.01); *G03B 21/2033* (2013.01); *G03B 21/204* (2013.01); *G03B 21/2066* (2013.01)
(58) Field of Classification Search
CPC .............. G03B 21/208; G03B 21/2013; G03B 21/2033; G03B 21/204; G03B 21/2066
See application file for complete search history.

(56) References Cited

U.S. PATENT DOCUMENTS

| | | | | |
|---|---|---|---|---|
| 9,155,161 | B2* | 10/2015 | Murai | G03B 21/2033 |
| 9,329,460 | B2* | 5/2016 | Iijima | G03B 21/006 |
| 2009/0066920 | A1* | 3/2009 | Yamagishi | G03B 21/2066 |
| | | | | 353/38 |

FOREIGN PATENT DOCUMENTS

JP        2000-180759        6/2000

* cited by examiner

*Primary Examiner* — Alan B Cariaso
(74) *Attorney, Agent, or Firm* — Wenderoth, Lind & Ponack, L.L.P.

(57) ABSTRACT

A projection-type display device includes a first collimator lens configured to collimate a plurality of laser beams of a first wavelength, a first condenser lens, a second collimator lens configured to collimate a plurality of laser beams of a second wavelength, a second condenser lens, a light diffusing element, a first integrator illumination system configured to superimpose the laser beams of the first wavelength to form a rectangular irradiation region for the first wavelength, a second integrator illumination system configured to superimpose the laser beams of the second wavelength to form a rectangular irradiation region for the second wavelength, a first deflection unit, a second deflection unit, a transfer optical system configured to transfer the rectangular irradiation region for the first wavelength and the second wavelength to a reflective light modulation element, and a projection lens configured to project image light.

18 Claims, 25 Drawing Sheets

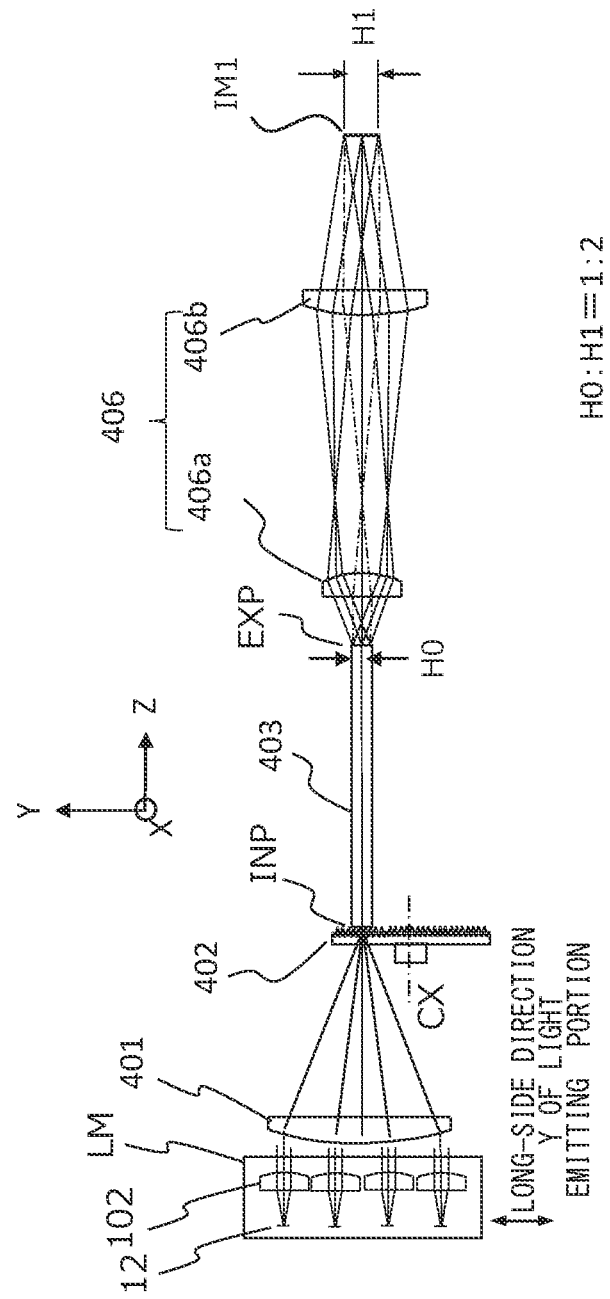

$\alpha - 2\theta \leq$ ANGLE OF REFLECTED BEAM WITH RESPECT TO BX $\leq \alpha + 2\theta$

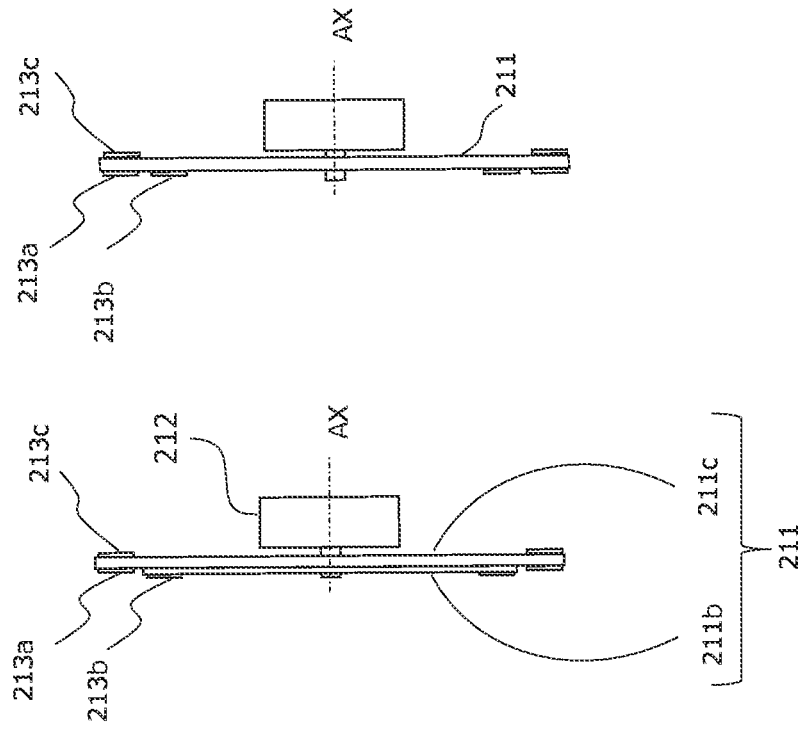

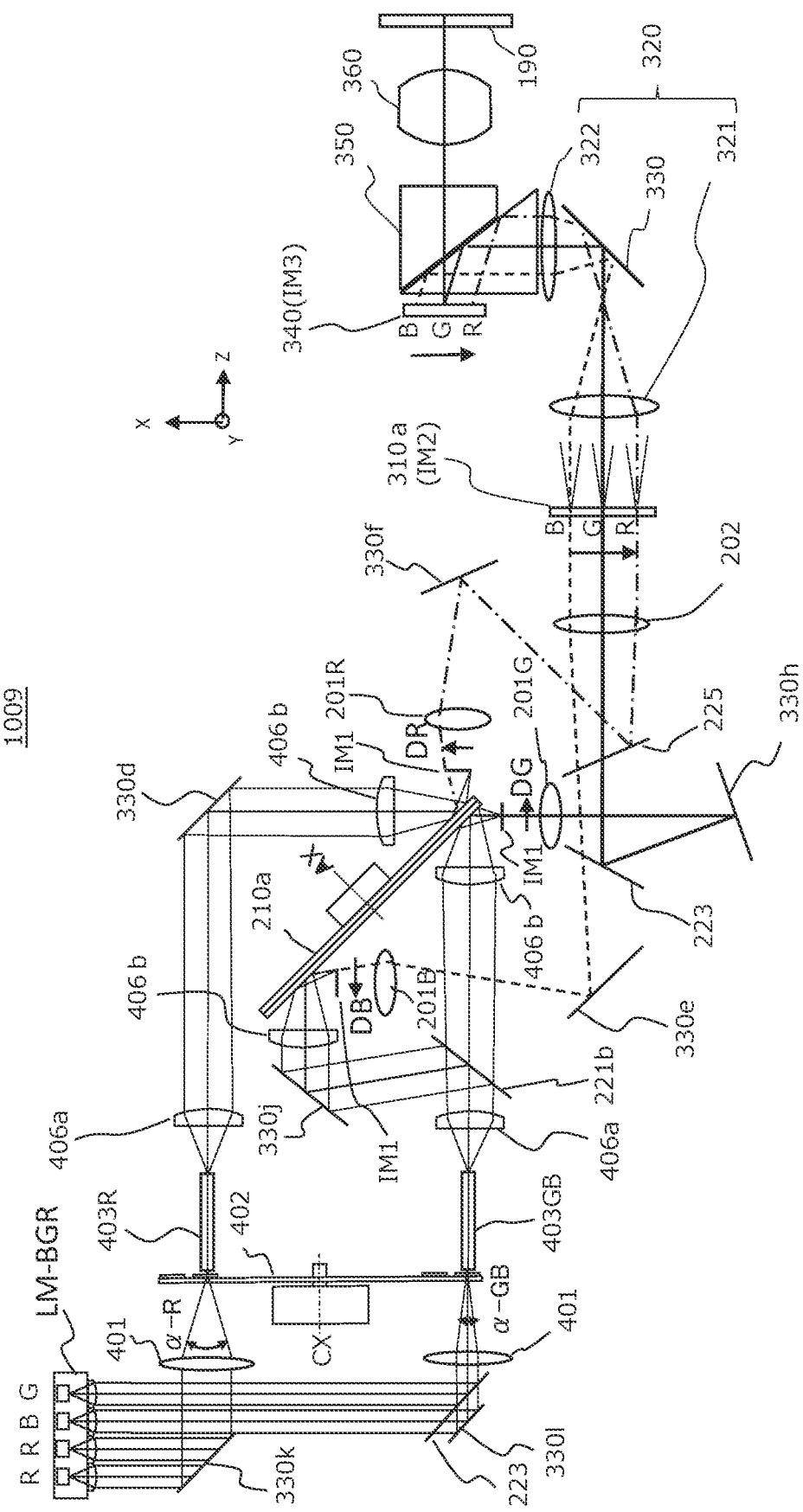

PROJECTION-TYPE DISPLAY DEVICE

BACKGROUND OF THE INVENTION

Field of the Invention

The present invention relates to a projection-type display device including a light source device.

Description of the Related Art

Hitherto, a projection-type display device using laser beams has been known.

JP 2000-180759 A discloses a projection-type display device including a laser light source, a photoacoustic modulator that optically modulates a laser beam according to a video signal, a polygonal mirror that horizontally scans the modulated laser beam, and a galvanometer mirror that vertically scans the modulated laser beam.

The projection-type display device described in JP 2000-180759 A includes an optical scanning unit using both a polygonal mirror for horizontal scanning and a galvanometer mirror for vertical scanning. However, the optical scanning in both horizontal and vertical directions requires a large optical path space, causing a problem that the device is enlarged.

Therefore, in the field related to a projection-type image display device that modulates a laser beam according to an image signal and projects the modulated laser beam, it has been expected to realize a device that is small in size, is easy to drive and control, and has high light use efficiency.

SUMMARY OF THE INVENTION

According to a first aspect of the present invention, a projection-type display device includes a first collimator lens configured to collimate a plurality of laser beams output from a plurality of semiconductor lasers that emits light at a first wavelength, a first condenser lens configured to condense the plurality of laser beams collimated by the first collimator lens, a second collimator lens configured to collimate a plurality of laser beams output from a plurality of semiconductor lasers that emits light at a second wavelength, a second condenser lens configured to condense the plurality of laser beams collimated by the second collimator lens, a light diffusing element including a light diffusing surface having an area wider than any of an irradiation spot of the laser beams of the first wavelength condensed by the first condenser lens and an irradiation spot of the laser beams of the second wavelength condensed by the second condenser lens, a first integrator illumination system configured to superimpose the laser beams of the first wavelength diffused by the light diffusing surface to form a rectangular irradiation region for the first wavelength, a second integrator illumination system configured to superimpose the laser beams of the second wavelength diffused by the light diffusing surface to form a rectangular irradiation region for the second wavelength, a first deflection unit disposed at a side of the first integrator illumination system with respect to a position where the rectangular irradiation region for the first wavelength is formed by the first integrator illumination system, a second deflection unit disposed at a side of the second integrator illumination system with respect to a position where the rectangular irradiation region for the second wavelength is formed by the second integrator illumination system, a transfer optical system configured to transfer the rectangular irradiation region for the first wavelength deflection-scanned by the first deflection unit and the rectangular irradiation region for the second wavelength deflection-scanned by the second deflection unit in an enlarged manner to a reflective light modulation element, and a projection lens configured to project image light output from the reflective light modulation element.

According to a second aspect of the present invention, a projection-type display device includes a first collimator lens configured to collimate a plurality of laser beams output from a plurality of semiconductor lasers that emits light at a first wavelength, a second collimator lens configured to collimate a plurality of laser beams output from a plurality of semiconductor lasers that emits light at a second wavelength, a synthesis unit configured to synthesize the plurality of laser beams collimated by the first collimator lens and the plurality of laser beams collimated by the second collimator lens in a superimposed manner, a first condenser lens configured to condense the plurality of laser beams synthesized by the synthesis unit, a light diffusing element including a light diffusing surface having an area wider than an irradiation spot of the plurality of laser beams condensed by the first condenser lens, a first integrator illumination system configured to superimpose the laser beams of the first wavelength among the plurality of laser beams diffused by the light diffusing surface to form a rectangular irradiation region for the first wavelength, a second integrator illumination system configured to superimpose the laser beams of the second wavelength among the plurality of laser beams diffused by the light diffusing surface to form a rectangular irradiation region for the second wavelength, a first deflection unit disposed at a side of the first integrator illumination system with respect to a position where the rectangular irradiation region for the first wavelength is formed by the first integrator illumination system, a second deflection unit disposed at a side of the second integrator illumination system with respect to a position where the rectangular irradiation region for the second wavelength is formed by the second integrator illumination system, a transfer optical system configured to transfer the rectangular irradiation region for the first wavelength deflection-scanned by the first deflection unit and the rectangular irradiation region for the second wavelength deflection-scanned by the second deflection unit in an enlarged manner to a reflective light modulation element, and a projection lens configured to project image light output from the reflective light modulation element. The first integrator illumination system and the second integrator illumination system share a rod on which the plurality of laser beams transmitted through the light diffusing surface are incident. The first integrator illumination system includes a separation element configured to separate the laser beams of the first wavelength from the plurality of laser beams emitted from the rod, and a relay lens configured to transfer an image from an emission surface of the rod. The second integrator illumination system includes a separation element configured to separate the laser beams of the second wavelength from the plurality of laser beams emitted from the rod, and a relay lens configured to transfer an image from the emission surface of the rod.

Further features of the present invention will become apparent from the following description of exemplary embodiments with reference to the attached drawings.

BRIEF DESCRIPTION OF THE DRAWINGS

FIG. 5 is a diagram for explaining an integrator illumination system according to the first embodiment.

FIG. 16A is a top view illustrating an appearance of an example of a deflector 210a.

FIG. 16B is a side view of the example of the deflector 210a.

FIG. 16C is a bottom view illustrating an appearance of the example of the deflector 210a.

FIG. 17A is a side view of a modification of the deflector 210a.

FIG. 17B is a side view of another modification of the deflector 210a.

FIG. 17C is a side view of still another modification of the deflector 210a.

FIG. 20 is a diagram illustrating a schematic configuration of an optical system of a projection-type display device according to a sixth embodiment.

DESCRIPTION OF THE EMBODIMENTS

Figure 1:
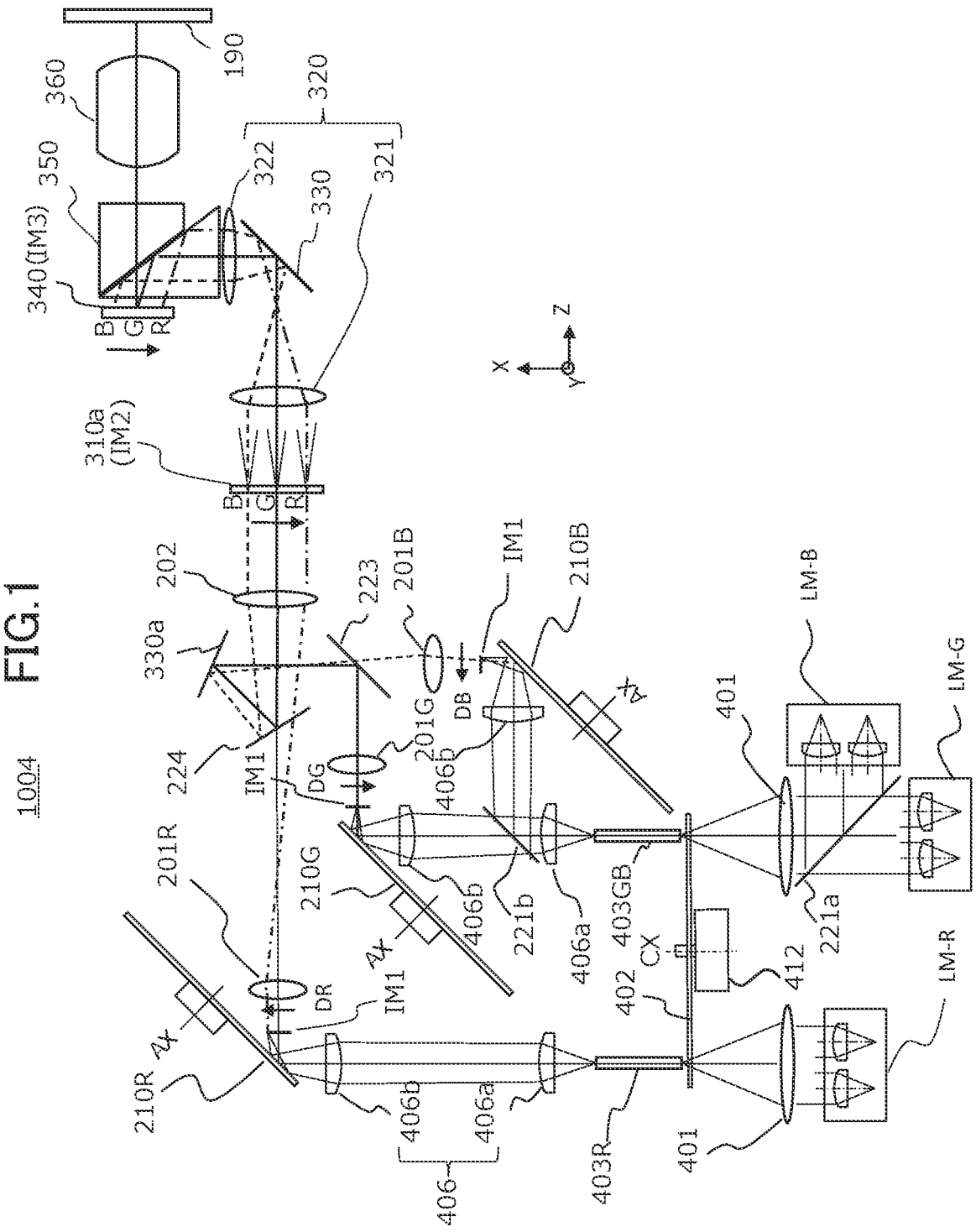
FIG. 1 is a diagram illustrating a schematic configuration of an optical system of a projection-type display device according to a first embodiment.

Projection-type display devices according to embodiments of the present invention will be described with reference to the drawings.

Note that the embodiments described below are exemplary, and for example, detailed configurations can be appropriately modified by those skilled in the art without departing from the gist of the present invention when the embodiments are implemented. In the drawings referred to in the following embodiments and description, elements denoted by the same reference numerals have the same functions unless otherwise specified. Note that, since the optical elements in the drawings are schematically expressed, actual shapes and configurations thereof are not necessarily expressed faithfully. For example, even if a single lens is shown in the drawings, a plurality of lenses may be formed unless otherwise specified.

In the following description, for example, an X-plus direction refers to the same direction as that indicated by an X-axis arrow in an illustrated coordinate system, and an X-minus direction refers to a direction opposite to that indicated by the X-axis arrow by 180 degrees in the illustrated coordinate system. In addition, when an X direction is simply mentioned, the X direction refers to a direction parallel to the X axis regardless of whether the X direction is different from the direction indicated by the illustrated X-axis arrow. The same applies to directions other than the X direction.

In the following description, red may be denoted by "R", green may be denoted by "G", and blue may be denoted by "B". Therefore, for example, R beams are synonymous with red beams, a G light source is synonymous with a green light source, and a B laser is synonymous with a blue laser.

First Embodiment

FIG. 1 is a diagram illustrating a schematic configuration of an optical system of a projection-type display device according to a first embodiment. For convenience of description, a mechanical mechanism for installing an optical element, a casing, electrical wiring, and the like are omitted in FIG. 1.

Overall Configuration

A projection-type display device 1004 includes a B light source including a laser module LM-B, a G light source including a laser module LM-G, an R light source including a laser module LM-R, a B deflector 210B, a G deflector 210G, an R deflector 210R, a light synthesis unit including a dichroic mirror 224, an optical path conversion mirror 330, a TIR prism 350, a reflective light modulation element 340, and a projection lens 360. The projection-type display device 1004 can optionally include a projection screen 190.

The light sources (the B light source, the G light source, and the R light source) of the respective colors will be described in detail below.

The B deflector 210B is a deflector that deflects a B beam emitted from the B light source in a DB direction. Similarly, the G deflector 210G is a deflector that deflects G beams emitted from the G light source in the DG direction, and the R deflector 210R is a deflector that deflects R beams emitted from the R light source in the DR direction. The deflector will be described in detail below. Note that the R deflector 210R may be referred to as a first deflection unit, the B deflector 210B may be referred to as a second deflection unit, and the G deflector 210G may be referred to as a third deflection unit.

The dichroic mirror 224 constituting the light synthesis unit has an optical characteristic of transmitting R beams and reflecting B and G beams. On the dichroic mirror 224, the optical elements are arranged in such a manner that the optical axis center of a front transfer lens 201B for B beams, the optical axis center of a front transfer lens 201G for G beams, and the optical axis center of a front transfer lens 201R for R beams overlap each other.

The light synthesis unit synthesizes the B beams (dotted line), the G beams (solid line), and the R beams (alternate long and short dash line) not to be superimposed on each other at any timing while traveling directions thereof are all aligned in the Z-plus direction. This is because deflection-scanning timings (deflection phases) of the B deflector 210B, the G deflector 210G, and the R deflector 210R are controlled in such a manner that the B beams, the G beams, and the R beams are not superimposed on each other on a screen of the reflective light modulation element 340. The scanning method will be described in detail below.

The B beams, the G beams, and the R beams emitted from the light synthesis unit (dichroic mirror 224) are redirected in the X-plus direction by the optical path conversion mirror 330, and are incident on the TIR prism 350.

The TIR prism 350 is, for example, an internal total reflection prism configured by combining two prisms, and totally reflects illumination light (B beams, G beams, and R beams) on an air gap surface such that the illumination light is incident on the reflective light modulation element 340 at a predetermined angle. As described above, the B beams, the G beams, and the R beams illuminate partial portions of the screen of the reflective light modulation element 340 not to be superimposed on each other.

For the reflective light modulation element 340, for example, a DMD in which micromirror devices are provided in an array is used. The micromirror corresponding to each display pixel is driven in such a manner that its reflection direction is changed by pulse width modulation according to a luminance level of a video signal. However, it is also possible to use another type of reflective light modulation device such as a reflective liquid crystal device.

A pixel in a screen area illuminated by the B beams is driven according to a luminance level of a B component of the video signal, and reflects B video light toward the TIR prism 350 at a predetermined angle. Similarly, a pixel in a screen area illuminated by the G beams is driven according to a luminance level of a G component of the video signal, and reflects G video light toward the TIR prism 350 at a predetermined angle. Furthermore, a pixel in a screen area illuminated by the R beams is driven according to a luminance level of an R component of the video signal, and reflects R video light toward the TIR prism 350 at a predetermined angle. In this manner, the modulation operation of the reflective light modulation device is performed in synchronization with the deflection scanning of the B deflector 210B, the G deflector 210G, and the R deflector 210R.

The video light (B video light, G video light, and R video light) is transmitted through the TIR prism 350, guided to the projection lens 360, and projected as a color video. The projection lens 360 includes one or a plurality of lenses, and may have an automatic focus adjustment function or a zoom function.

The projection screen 190 is used in a case where a rear projection-type display device is formed. In addition, although the projection screen 190 is often installed in a case where a front projection-type display device is formed, the projection screen 190 is not necessarily installed in a case where a user projects light onto a certain wall surface or the like.

Light Source

The B light source, the G light source, and the R light source will be described. The B light source includes a laser module LM-B including a semiconductor laser that emits a B beam and a collimator lens, the G light source includes a laser module LM-G including a semiconductor laser that emits a G beam and a collimator lens, and the R light source includes a laser module LM-R including a semiconductor laser that emits an R beam and a collimator lens. Since the basic configurations of the light sources for the respective colors are similar except for the light emission wavelengths of the semiconductor lasers, the B, G, and R light sources may hereinafter be simply described as light sources without distinguishing the colors.

Laser Module

Each of the B light source, the G light source, and the R light source includes a laser module LM in which pairs each including a semiconductor laser and a collimator lens are arranged in a one-dimensional or two-dimensional array.

Figure 2A:
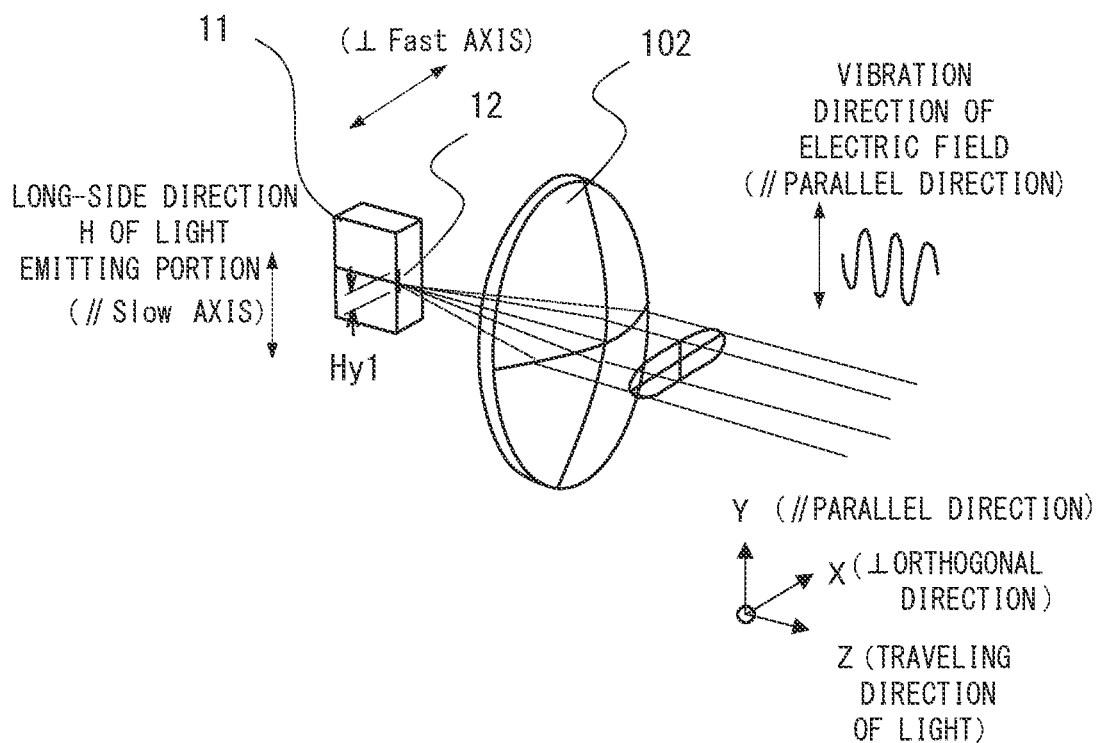
FIG. 2A is a schematic diagram illustrating one of pairs each including a semiconductor laser 11 and a collimator lens 102 included in the laser module LM.

FIG. 2A is a schematic diagram illustrating one of pairs each including a semiconductor laser and a collimator lens included in the laser module LM. Reference numeral 11 denotes a semiconductor laser, and reference numeral 12 denotes a light emitting portion of the semiconductor laser 11. In FIG. 2A, an X-Y-Z coordinate system is displayed by inverting the Z-axis direction by 180° with respect to the X-Y-Z coordinate system in FIG. 1 based on the direction of the laser module LM-B in FIG. 1. In FIG. 2A, the long-side direction H of the light emitting portion 12 is illustrated to be parallel to the Y direction, and the traveling direction of the light emitted from the light emitting portion 12 is illustrated to be parallel to the Z direction.

The long-side direction H of the light emitting portion 12 is typically a direction in which an active layer sandwiched between a P-type cladding layer and an N-type cladding layer extends on a side surface of a semiconductor chip constituting the semiconductor laser 11. As illustrated in FIG. 2A, in the following description, a direction parallel to the long-side direction H of the light emitting portion 12 of the semiconductor laser 11 may be referred to as a "parallel direction" or a "slow-axis", and a direction orthogonal to the long-side direction of the light emitting portion 12 may be referred to as an "orthogonal direction" or a "fast-axis". The semiconductor laser 11 emits linearly polarized light, and a vibration direction of an electric field thereof is a parallel direction (Y direction).

Figure 3A:
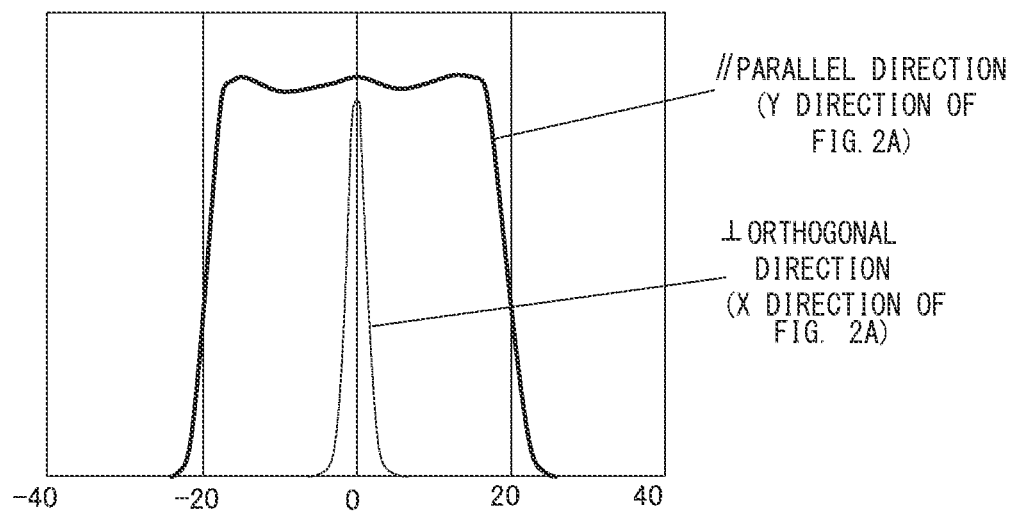
FIG. 3A is a diagram illustrating a near-field pattern of a beam output from the semiconductor laser 11.
Figure 3B:
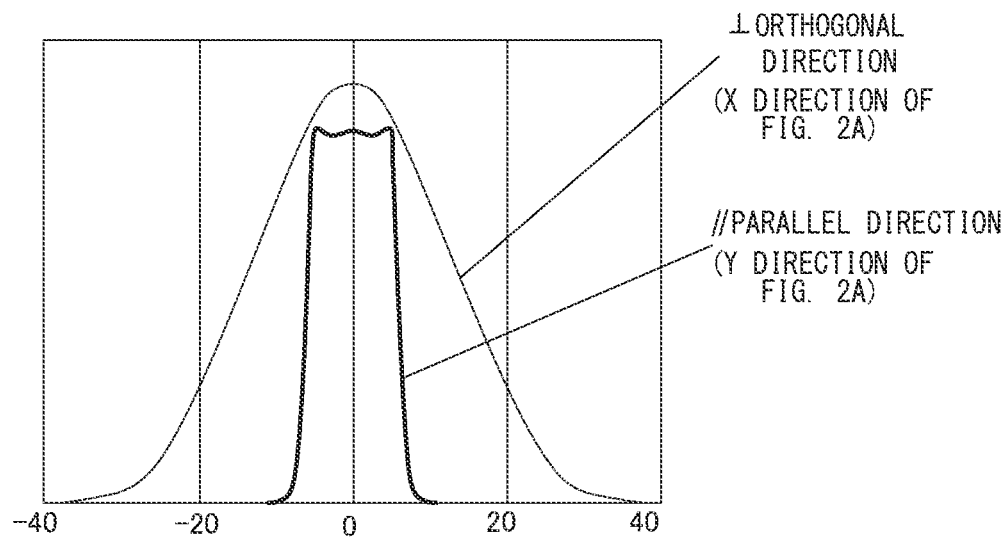
FIG. 3B is a diagram illustrating a far-field pattern of a beam output from the semiconductor laser 11.

It is known that an angle characteristic of a beam output from the semiconductor laser 11 varies depending on an emission direction. FIG. 3A illustrates a near-field pattern of the output beam, and FIG. 3B illustrates a far-field pattern of the output beam.

As illustrated in FIG. 3A, it can be seen that the near-field pattern has a beam profile reflecting a shape (long side and short side) of the light emitting portion. On the other hand, as the beam travels, the beam spreads as illustrated in the far-field pattern of FIG. 3B. That is, it can be seen that when viewed in the parallel direction, the beam emitted from the semiconductor laser 11 travels in a pattern in which the intensity distribution is uniform within a narrow angular range with a small spread. On the other hand, it can be seen that when viewed in the orthogonal direction, the beam emitted from the semiconductor laser 11 spreads in a wider angular range as the beam travels than that when viewed in the parallel direction in a (Gaussian) pattern in which the intensity distribution has a mountain shape. This is because the active layer of the semiconductor laser has a small thickness in the orthogonal direction, and thus is greatly affected by diffraction when light is emitted. In view of the far-field pattern, the parallel direction with a small spread can be referred to as a slow-axis, and the orthogonal direction with a large spread can be referred to as a fast-axis.

In the present embodiment, as illustrated in FIG. 2A, a laser beam emitted from the semiconductor laser 11 is formed using a collimator lens 102 (first collimator lens). That is, the beams emitted from the light emitting portion 12 having a length Hy1 in the long-side direction are collimated by the collimator lens 102, and travel in the Z direction as beams having elliptical cross sections. The major axis of the elliptical shape is parallel to the X direction, and the minor axis of the elliptical shape is parallel to the Y direction.

Figure 4A:
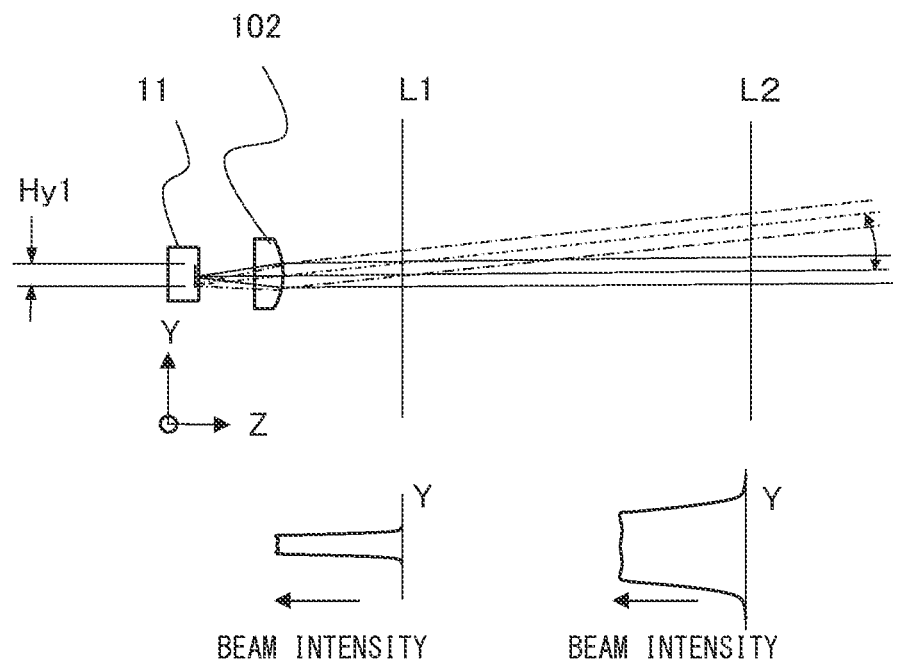
FIG. 4A is a diagram illustrating a spread of a beam in a parallel direction.
Figure 4B:
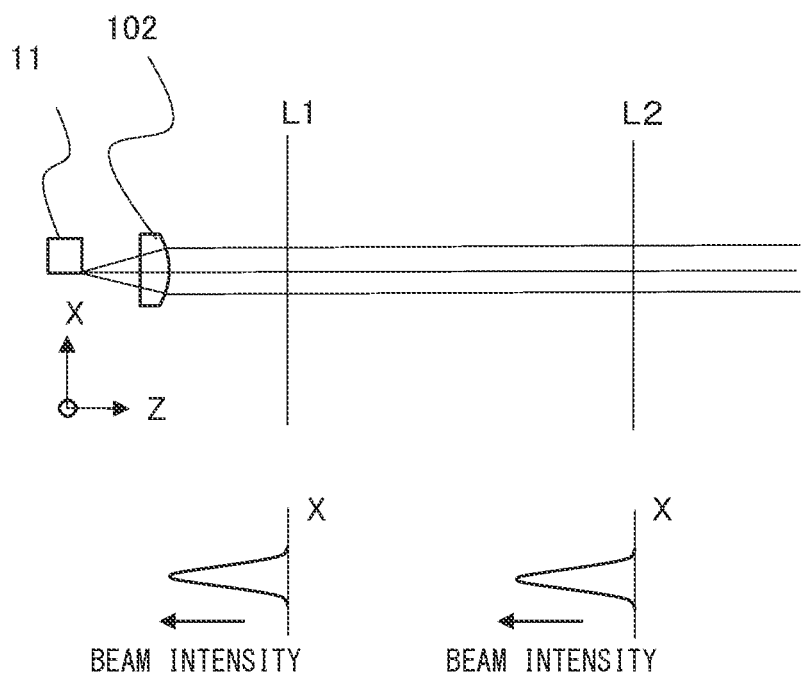
FIG. 4B is a diagram illustrating a spread of a beam in an orthogonal direction.

Even when the beams pass through the collimator lens 102, the beams are not completely parallel to the optical axis (Z direction), and how the beams spread differs between the parallel direction (long-side direction of the light emitting portion) and the orthogonal direction (short-side direction of the light emitting portion). The difference in how the beams spreads after passing through the collimator lens 102 will be described with reference to FIGS. 4A and 4B. FIG. 4A illustrates a spread in the parallel direction, and FIG. 4B illustrates a spread in the orthogonal direction.

As illustrated in FIG. 4A, when the beams are viewed in the parallel direction, the beam intensity is flat at the top, but the beam diameter increases as the bears advance in the Z direction, so that it cannot be said that divergence is good. On the other hand, as illustrated in FIG. 4B, it can be seen that when the beams are viewed in the orthogonal direction, changes in beam intensity distribution and beam diameter are small even when the distance from the collimator lens 102 changes. That is, after being transmitted through the collimator lens 102, the laser beams have higher parallelism and better divergence in the orthogonal direction (the fast-axis of the semiconductor laser) than in the parallel direction (the slow-axis of the semiconductor laser).

As will be described below, in the present invention, beams are deflected for scanning along the orthogonal direction to illuminate the light modulation element by utilizing the property that the divergence of the beams output from the light source is excellent (the parallelism of the beams is high) in the orthogonal direction (the short-side direction of the rectangle). This is because the deflection of the beams for scanning along the direction in which the divergence is excellent is advantageous in preventing superimposition between B-color, G-color, and R-color irradiation regions on the screen of the light modulation element.

Figure 2B:
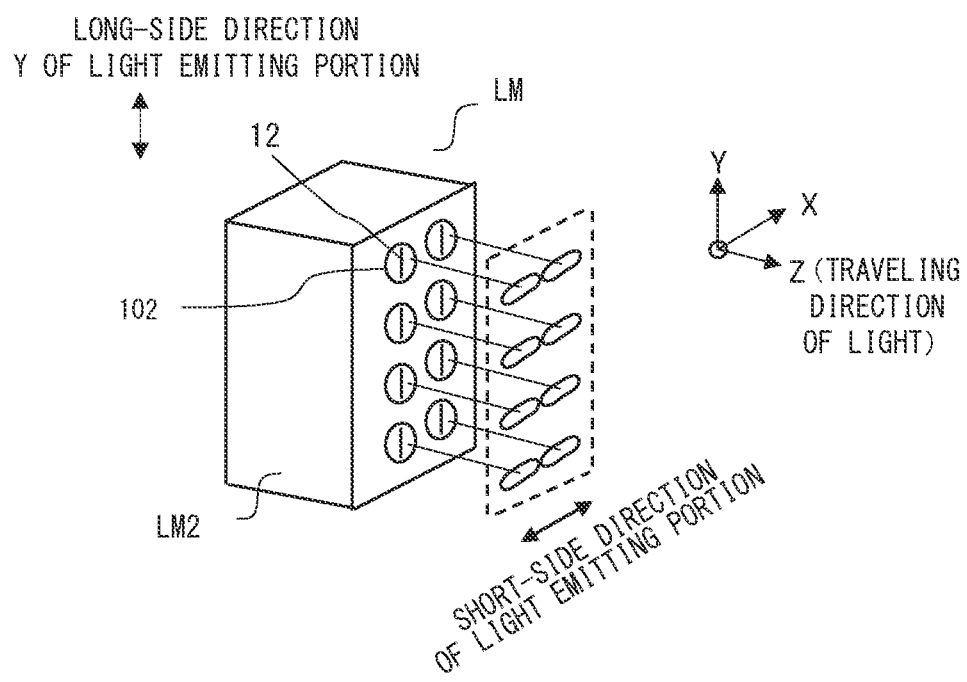
FIG. 2B is a schematic diagram illustrating a laser module LM in which 4×2 pairs each including a semiconductor laser and a collimator lens 102 are arranged.

The light source for each color includes a laser module LM including a plurality of pairs each including a semiconductor laser and a collimator lens 102 (first collimator lens). FIG. 2B is a schematic diagram illustrating a laser module LM in which 4×2 pairs each including a semiconductor laser 11 and a collimator lens 102 are arranged. In FIG. 2B, an X-Y-Z coordinate system is displayed by inverting the Z-axis direction by 180° with respect to the X-Y-Z coordinate system in FIG. 1 based on the direction of the laser module LM-B in FIG. 1.

In the laser module LM, the plurality of semiconductor lasers is arranged at equal intervals along the Y direction. In addition, all the semiconductor lasers are disposed such that the long-side directions of the light emitting portions 12 are along the Y direction. Although an example using semiconductor lasers of 4×2 elements is described, the number of elements is not limited to this example. The laser module LM may be configured in such a manner that a plurality of semiconductor lasers is arranged in only one row or in three or more rows along the Y direction. Beams output from the light source including semiconductor lasers in one element row or in three or more element rows along the Y direction also have better divergence in the short-side direction of the light emitting portion than in the long-side direction of the light emitting portion.

Integrator Illumination System/Optical Superimposing Unit

The light source according to the present embodiment includes an integrator illumination system INT for superimposing a plurality of laser beams emitted from the laser module LM to form a rectangular irradiation region. The integrator illumination system INT will be described with reference to FIGS. 5 to 7B.

The laser beams emitted from the respective semiconductor lasers 11 included in the laser module LM are approximately parallel by the action of the collimator lenses 102, but the divergence is as described above. The light source according to the present embodiment includes an integrator illumination system INT that superimposes laser beams emitted from the respective semiconductor lasers to form a rectangular irradiation region IM1 illustrated in FIG. 6C.

FIG. 5 is a diagram for describing the light source according to the first embodiment, that is, an integrator illumination system including a rod integrator. The integrator illumination system according to the present embodiment includes a laser module LM, a condenser lens 401, a light diffusing element 402, a rod integrator 403, and a relay lens 406 to form a rectangular irradiation region IM1. The semiconductor laser, the light emitting portion 12 of the semiconductor laser, the collimator lens 102, and the like included in the laser module LM are as described with reference to FIGS. 2A to 4B. In FIG. 5, an X-Y-Z coordinate system is displayed by inverting the Z-axis direction by 180° with respect to the X-Y-Z coordinate system in FIG. 1 based on the direction of the laser module LM-B in FIG. 1, but a turn back of the optical path on the way from the laser module LM to the rectangular irradiation region IM1 is omitted for convenience of illustration.

The laser beams emitted from the respective semiconductor lasers included in the laser module LM are approximately parallel by the action of the collimator lenses 102, but the divergence is as described above. The substantially collimated laser beams output from the laser module LM are condensed toward an incident surface INP of the rod integrator 403 by the condenser lens 401. In FIG. 5, the condenser lens 401 is illustrated as one convex lens, but may be configured as a plurality of lenses for the purpose of suppressing aberration or the like.

The light diffusing element 402 is disposed in the vicinity of the incident surface INP of the rod integrator 403, and the laser beams diffused by the light diffusing element 402 are incident onto the rod integrator 403 from the incident surface INP. Since the divergence of the beams output from the laser module LM is better in the short-side direction of the rectangle than in the long-side direction of the rectangle, it is possible to suppress the light take-in loss on the incident surface INP of the rod integrator 403 and to improve the utilization efficiency. The light incident on the rod integrator 403 is emitted from an emission surface EXP after repeating total reflection on a side surface. The illuminance distribution on the emission surface EXP can be uniform by appropriately setting the diffusing power (diffusion angle) of the light diffusing element 402 and the length of the rod integrator 403.

In the present embodiment, B laser beams, G laser beams, and R laser beams are diffused using the single rotatable light diffusing element 402. A side view of the light diffusing element 402 is illustrated on the left side of FIG. 12A, and a top view of the light diffusing element 402 is illustrated on the right side of FIG. 12A. The light diffusing element 402 includes a light-transmissive substrate SUB on which a light diffusing surface DIF is formed, and a motor 412 that rotates the light-transmissive substrate SUB about a rotation axis CX. The light diffusing surface DIF can be formed by, for example, imparting a finely uneven shape to a main surface on a side where laser beams are incident on the light-transmissive substrate SUB, a main surface on a side where laser beams transmitted through the light-transmissive substrate SUB are emitted, or both surfaces thereof.

When beams having high coherence such as laser beams is used after being superimposed by the integrator optical system, it is necessary to consider not only the geometrical optical action but also the wave optical action. Considering the wave optical action, laser beams incident on the rod integrator 403 may interfere with each other, generating bright and dark patterns such as interference fringes and spots in the rectangular irradiation region IM1. When a non-uniform light and dark pattern is fixedly generated inside the rectangular irradiation region IM1, image quality degradation that can be visually recognized by the user may occur in a display image, which is not preferable as illumination light for display.

Therefore, the light diffusing element 402 used in the present embodiment includes a light diffusing surface DIF having an area wider than an irradiation spot (irradiation position) of laser beams, and includes a moving mechanism (motor 412) for moving the light diffusing surface DIF, such that the portion of the light diffusing surface DIF irradiated with the laser beams can be dynamically changed. In other words, the light diffusing element 402 can be said to be an optical element including a dynamic diffusing surface.

In the present embodiment, the light diffusing element including the dynamic light diffusing surface is disposed between the laser light source and the incident surface of the integrator optical system. In the present embodiment, as illustrated in FIG. 5, the light diffusing element 402 is disposed between the laser module LM and the incident surface INP of the rod integrator 403. By moving the portion of the light diffusing surface DIF irradiated with laser beams at an appropriate speed after the above-described arrangement is set, it is possible to reduce the temporal and spatial coherence between the beams incident on the integrator optical system. As a result, when beams are superimposed in the integrator optical system, it is possible to suppress interference between the beams and generation of bright and dark distribution such as interference fringes. By moving the light diffusing surface at an appropriate speed, it is possible to make effective illuminance distribution in the rectangular irradiation region IM1 extremely uniform in terms of human visual characteristics.

In the present embodiment, a disk-shaped light diffusing plate is rotated so that the laser beam-irradiated position relatively moves along the circumference in the light diffusing plate, but the configuration of the light diffusing element including the dynamic light diffusing surface is not limited thereto. For example, the laser beam-irradiated position on the light diffusing plate can be dynamically changed with time by causing the diffusing plate to reciprocate through linear movement or zigzag movement using a drive mechanism such as a piezo actuator. In such a form as well, the coherence between the laser beams incident on the integrator optical system can be reduced, and accordingly, it is possible to make effective illuminance distribution in the rectangular irradiation region IM1 extremely uniform in terms of human visual characteristics.

Figure 12A:
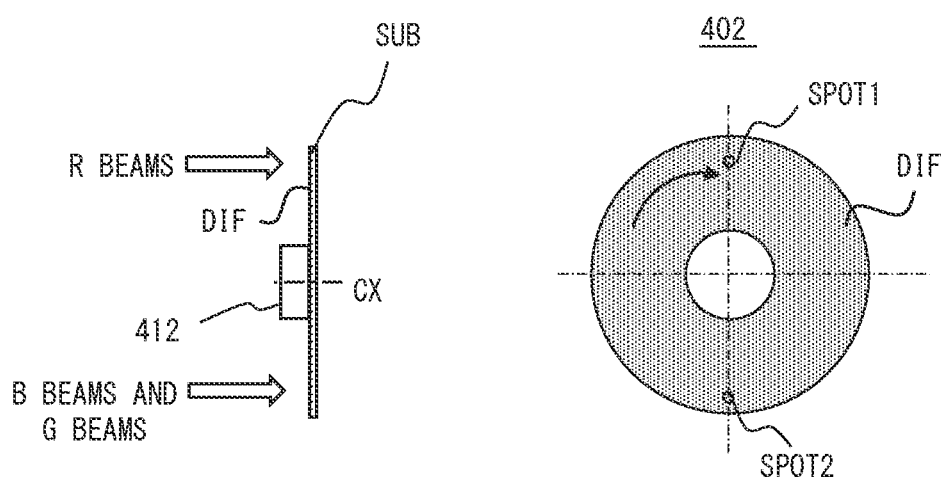
FIG. 12A illustrates a side view and a top view of a light diffusing element 402 according to the embodiment.

In the present embodiment, as illustrated in FIG. 12A. R beams are emitted to a position indicated as SPOT1, and B beams and G beams are emitted to a position indicated as SPOT2. That is, the laser beams of three colors of B. G. and R are diffused by the single light diffusing element 402 rotated by the single motor 412. According to the present embodiment, the number of components can be reduced as compared with that in a case where a motor and a light diffusing element are provided for each color, thereby suppressing the cost for the projection-type display device.

Note that the light diffusing element 402 rotated by the single motor 412 is not limited to the example of FIG. 12A, and may have another form. As an example of the light diffusing element 402 having another form, a side view of the light diffusing element 402 is illustrated on the left side of FIG. 12B, and a top view of the light diffusing element 402 is illustrated on the right side of FIG. 12B. In this example, an annular diffusing surface DIF1 is provided on an inner circumferential side (a side close to the rotation axis CX) of the disk-shaped light-transmissive substrate SUB, and an annular diffusing surface DIF2 is provided on a side outside the inner circumferential side.

In general, an R-light semiconductor laser often does not have good divergence as compared with a B-light or G-light semiconductor laser. In addition, the R-light semiconductor laser has a smaller output power per single element than the B-light or G-light semiconductor laser, and accordingly, it is necessary to arrange more elements, which may increase the NA as a light source. Therefore, in the example of FIG. 12B, the R beams may be emitted to a position indicated as SPOT1 of the diffusing surface DIF1, and the B beams and the G beams may be emitted to a position indicated as SPOT2 of the diffusing surface DIF2, such that the diffusion characteristics of the diffusing surface DIF1 and the diffusing surface DIF2 can be set differently according to the difference in output characteristics between the semiconductor lasers. For example, by configuring the light diffusing element 402 in such a manner that the diffusing surface DIF1 has a smaller diffusing power than the diffusing surface DIF2, the color balance of the illumination light illuminating the reflective light modulation element 340 can be improved. The diffusing surface DIF1 may be referred to as a first diffusing region, and the diffusing surface DIF2 may be referred to as a second diffusing region.

Returning to FIG. 5, by transferring an image emitted from the emission surface EXP of the rod integrator 403 to the relay lens 406, a rectangular irradiation region IM1 having high uniformity in illuminance can be obtained. By appropriately setting the transfer magnification of the relay lens, it is possible to obtain the irradiation region IM1 in a desired size such as a reduced, equal, or enlarged size. Note that, in FIG. 5, the relay lens 406 includes two lenses of a front convex lens 406a and a rear convex lens 406b, but the configuration of the relay lens 406 is not limited to this example.

Figure 6A:
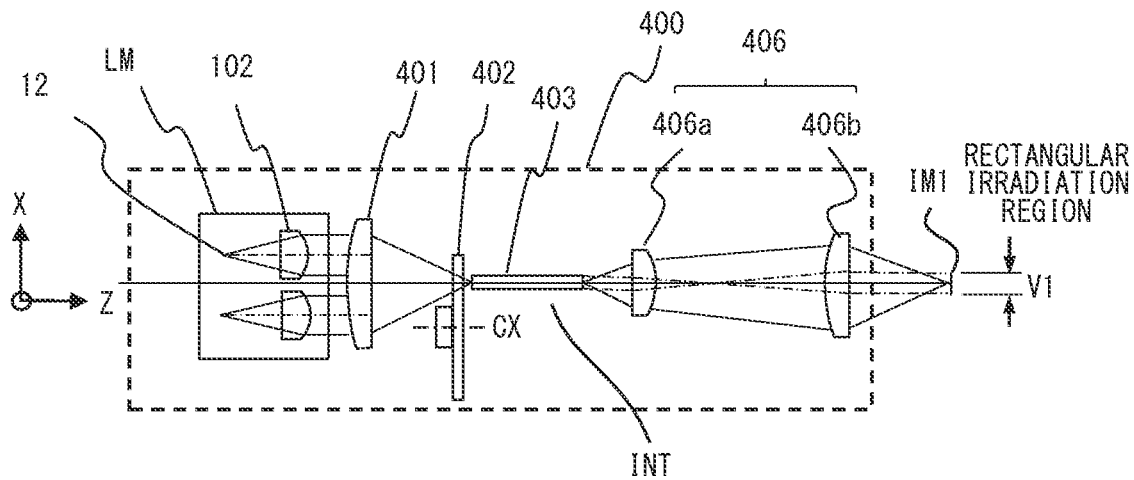
FIG. 6A is a diagram of the integrator illumination system INT according to the first embodiment as viewed from one direction.
Figure 6B:
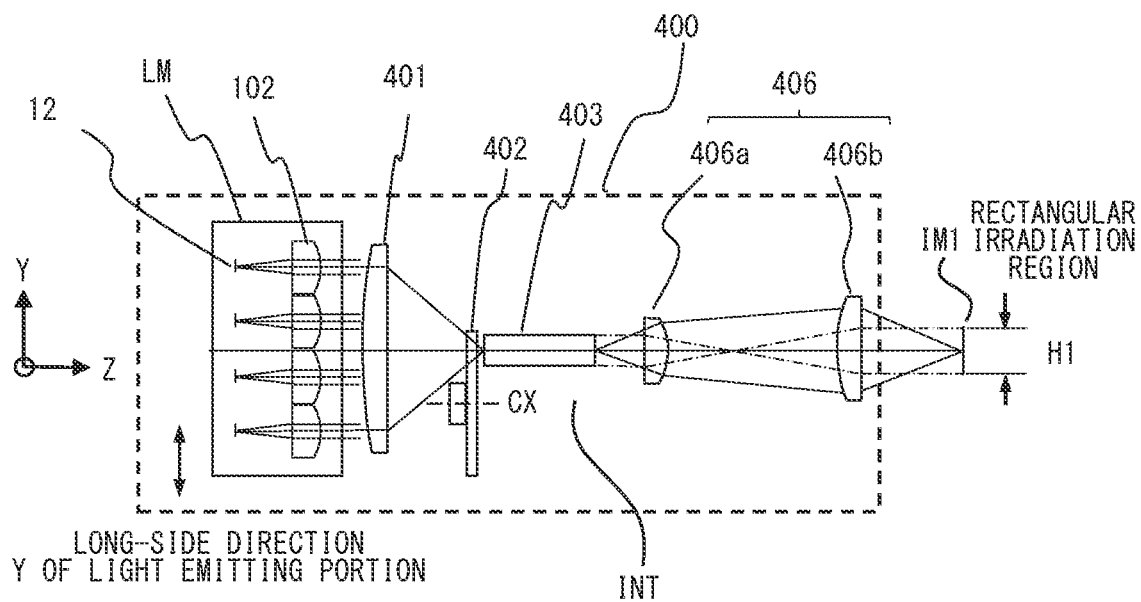
FIG. 6B is a diagram of the integrator illumination system INT according to the first embodiment as viewed from a direction orthogonal to FIG. 6A.

FIG. 6A is a diagram illustrating the light source including the integrator illumination system INT in a direction in which the short-side direction (X direction) of the light emitting portion 12 of the semiconductor laser is visible. FIG. 6B is a diagram illustrating the light source including the integrator illumination system INT in a direction in which the long-side direction (Y direction) of the light emitting portion 12 of the semiconductor laser is visible.

Here, a specific configuration of the light source for each color in the projection-type display device illustrated in FIG. 1 and a correspondence relationship with FIGS. 5, 6A, and 6B will be described.

First, for the B light source, the laser module LM-B and a rod integrator 403GB illustrated in FIG. 1 correspond to the laser module LM and the rod integrator 403 in FIG. 5, etc., respectively. Blue laser beams output from the laser module LM-B advance in the Z-minus direction in FIG. 1, but it is illustrated in FIG. 5, etc. that the blue laser beams advance in the Z-plus direction. A dichroic mirror 221a is provided between the laser module LM-B and the condenser lens 401 (shared with G) in the optical path of the B beams in FIG. 1, but is omitted in FIG. 5, etc. As described above, the dichroic mirror 221a has an optical characteristic of transmitting the G beams but reflecting the B beams. In addition, a dichroic mirror 221b is provided between the front convex lens 406a (shared with G) and the rear convex lens 406b in the optical path of the B beams in FIG. 1, but is omitted in FIG. 5, etc. The dichroic mirror 221b has an optical characteristic as a separation element that transmits the G beams but reflects the B beams. The B deflector 210B is disposed between the rear convex lens 406b and the irradiation region IM1 in the optical path of the B beams. In FIG. 1, but is omitted in FIG. 5, etc.

Next, for the G light source, the laser module LM-G and a rod integrator 403GB illustrated in FIG. 1 correspond to the laser module LM and the rod integrator 403 in FIG. 5, etc., respectively. Green laser beams output from the laser module LM-G advance in the X-plus direction in FIG. 1, but it is illustrated in FIG. 5, etc. that the green laser beams advance in the Z-plus direction. The dichroic mirror 221a is provided between the laser module LM-G and the condenser lens 401 (shared with B) in the optical path of the G beams in FIG. 1, but is omitted in FIG. 5, etc. The dichroic mirror 221a has an optical characteristic of transmitting the G beams but reflecting the B beams. In addition, a dichroic mirror 221b is provided between the front convex lens 406a (shared with B) and the rear convex lens 406b in the optical path of the G beams in FIG. 1, but is omitted in FIG. 5, etc. The dichroic mirror 221b has an optical characteristic of transmitting the G beams but reflecting the B beams. The G deflector 210G is disposed between the rear convex lens 406b and the irradiation region IM1 in the optical path of the G beams In FIG. 1, but is omitted in FIG. 5, etc.

Next, for the R light source, the laser module LM-R and a rod integrator 403R illustrated in FIG. 1 correspond to the laser module LM and the rod integrator 403 in FIG. 5, etc., respectively. Red laser beams output from the laser module LM-R advance in the X-plus direction in FIG. 1, but it is illustrated in FIG. 5, etc. that the red laser beams advance in the Z-plus direction. The R deflector 210R is disposed between the rear convex lens 406b and the irradiation region IM1 in the optical path of the R beams In FIG. 1, but is omitted in FIG. 5, etc.

Returning to FIGS. 6A and 6B, the rod integrator 403 may be any optical element that can totally reflect incident light on a side surface thereof. As the rod integrator 403, for example, one illustrated in FIG. 7A or one illustrated in FIG. 7B can be used. Preferably, the rod integrator 403 is configured in such a manner that the shape of the incident surface INP, the shape of the emission surface EXP, and the cross-sectional shape of the rod portion are the same.

Figure 7A:
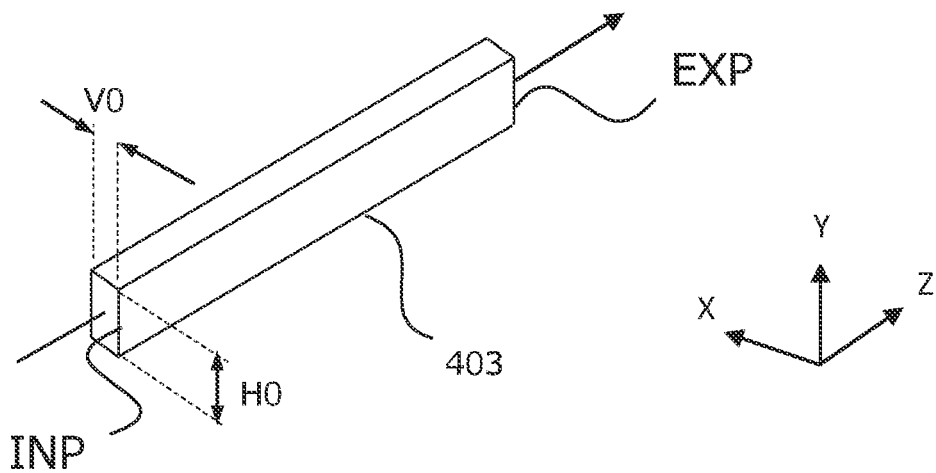
FIG. 7A is a diagram illustrating a bulk rod used in the integrator illumination system.

The rod integrator 403 illustrated in FIG. 7A is, for example, a solid quadrangular prism element made of an optical material such as optical glass or light-transmissive resin, and the incident surface INP and the emission surface EXP, which are end surfaces, have a rectangular shape with a long side being H0 and a short side being V0. It is preferable to apply anti-reflection films (AR coatings) to the incident surface INP and the emission surface EXP.

Figure 7B:
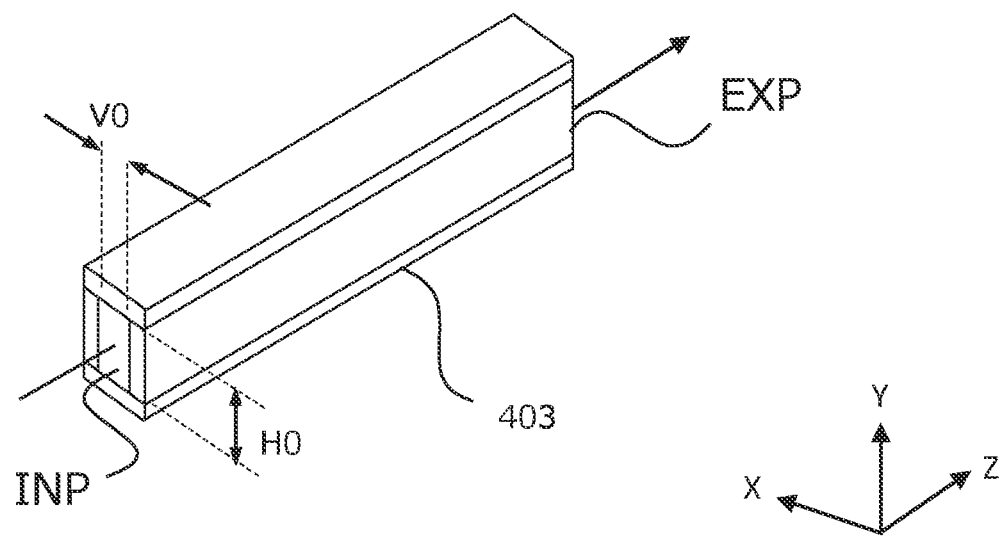
FIG. 7B is a diagram illustrating a hollow rod used in the integrator illumination system.

In addition, the rod integrator 403 illustrated in FIG. 7B is a hollow quadrangular prism element, that is, a tube-shaped element, and a reflecting surface made of, for example, aluminum or the like is formed on an inner surface of the tube. The incident surface INP and the emission surface EXP, which are opening portions of the tube, have a rectangular shape with a long side being H0 and a short side being V0. For example, after reflecting films such as aluminum films are vapor-deposited on glass or metallic plate-like substrates, the substrates can be bonded to each other to be assembled into a tubular shape, thereby manufacturing the rod integrator 403 at a relatively low cost.

Figure 6C:
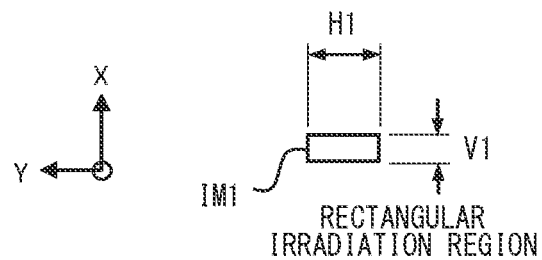
FIG. 6C is a diagram illustrating a rectangular irradiation region IM1.

Even though the incident surface INP and the emission surface EXP of the rod integrator 403 have a rectangular shape with the long side being H0 and the short side being V0 as described above, a rectangular irradiation region IM1 with a long side being H1 and a short side being V1 as illustrated in FIG. 6C is formed by the relay lens 406. The long side of the rectangular irradiation region IM1 corresponds to the parallel direction (the slow-axis direction of the semiconductor laser), and the short side corresponds to the orthogonal direction (the fast-axis direction of the semiconductor laser). For example, if the incident surface INP and the emission surface EXP of the rod integrator 403 have a rectangular shape with an X-direction dimension (short side V0) of 0.33 mm and a Y-direction dimension (long side H0) of 1.67 mm, and the magnification of the relay lens 406 is 1.2 times, a rectangular irradiation region IM1 with V1 of about 0.4 mm and H1 of about 2 mm can be obtained.

Deflector

As illustrated in FIG. 1, the deflectors (B deflector 210B, G deflector 210G, and R deflector 210R) are disposed between the light sources (B light source, G light source, and R light source) and the rectangular irradiation regions IM1 irradiated by the respective light sources.

The B deflector 210B, the G deflector 210G, and the R deflector 210R will be described. These deflectors are deflection elements used for deflecting laser beams of different colors for scanning. They have the same basic configuration, and thus, a deflector 210 may be described below without particularly specifying a color.

Figure 8A:
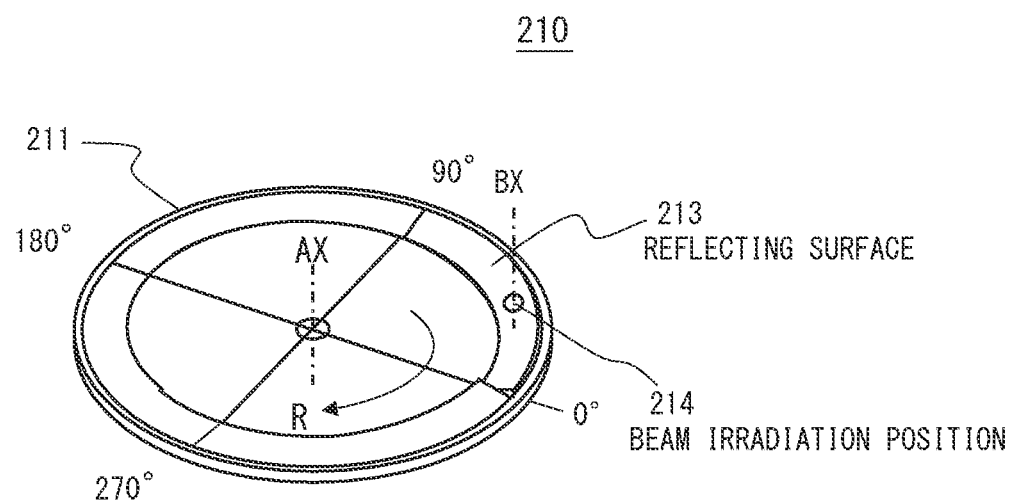
FIG. 8A is a perspective view illustrating an appearance of an example of a deflector 210.
Figure 8B:
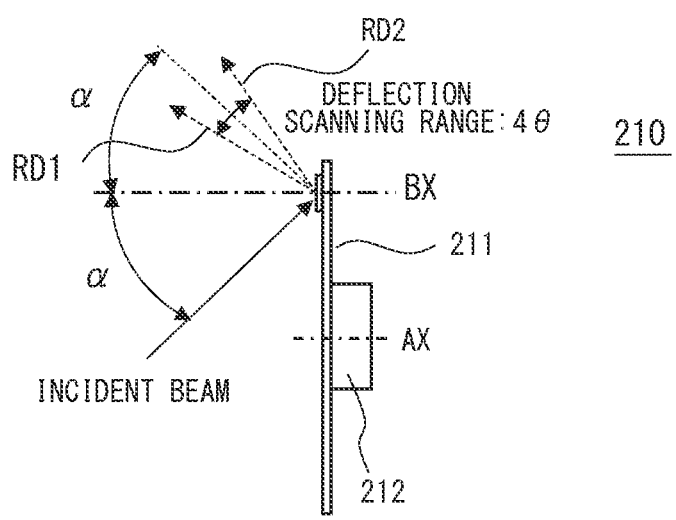
FIG. 8B is a side view of the deflector 210.

FIG. 8A is a perspective view illustrating an appearance of an example of the deflector 210, and FIG. 8B is a side view of the deflector 210.

The deflector 210 includes a rotatable disk-shaped base 211 and a motor 212 that rotates the base 211 about a rotation axis AX. A reflecting surface 213, which is a belt-shaped optical surface, is provided along a circumference on a main surface of the disk-shaped base 211. Here, in order to specify the position of the reflecting surface, as illustrated in FIG. 8A, the angular coordinate is set counterclockwise around the rotation axis AX. (In FIG. 8A, 0°, 90°, 180°, and 270° are shown). An axis BX illustrated in FIG. 8A is an axis that is parallel to the rotation axis AX and passes through the reflecting surface 213. What is illustrated as a beam irradiation position 214 is a beam position when beams output from the light source is reflected before reaching the rectangular irradiation region IM1.

Figure 9A:
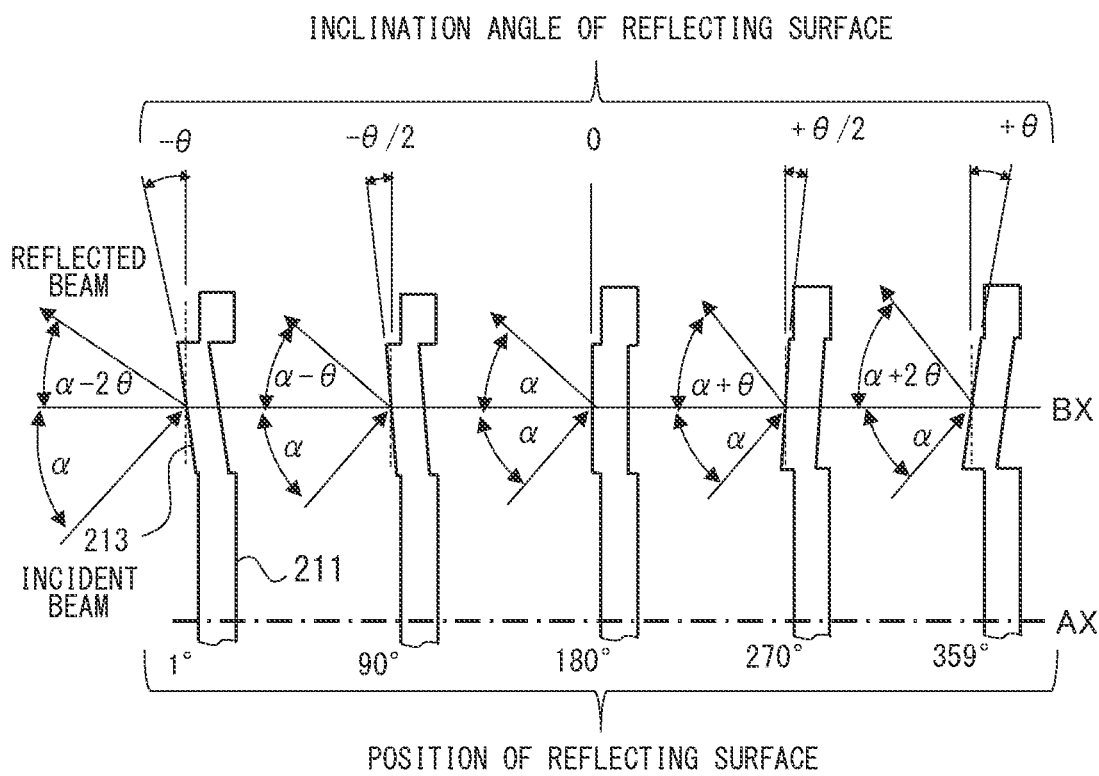
FIG. 9A is a cross-sectional view for explaining a position and an inclination angle of a reflecting surface of the deflector 210.
Figure 9B:
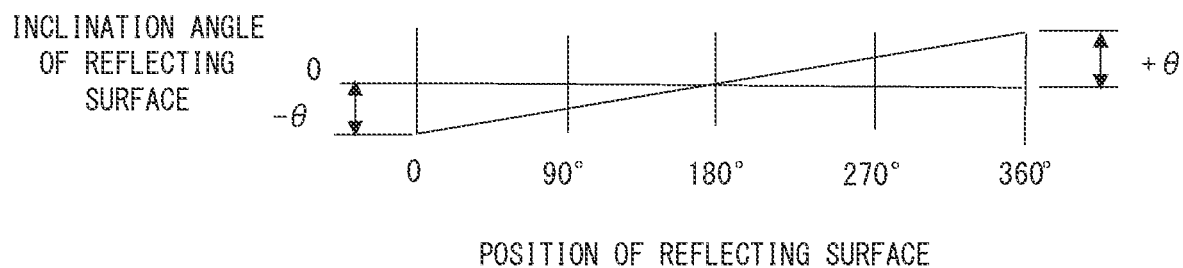
FIG. 9B is a graph for explaining the position and the inclination angle of the reflecting surface of the deflector 210.

The band-shaped reflecting surface 213 is twisted such that the angle with respect to the axis BX (that is, the angle with respect to the rotation axis AX) varies depending on the position. The angle of the reflecting surface will be described with reference to FIGS. 9A and 9B. In FIGS. 9A and 9B, what is illustrated as a position of the reflecting surface is a position defined by the angular coordinate described in FIG. 8A. In addition, what is illustrated as an inclination angle of the reflecting surface is an inclination angle of the reflecting surface with respect to the main surface of the disk-shaped base 211 (that is, the surface orthogonal to the axis BX).

As illustrated in FIG. 9B, the reflecting surface 213 is formed in such a manner that the inclination angle of the reflecting surface changes linearly with respect to the position of the reflecting surface. As illustrated in FIGS. 8A and 9B, the inclination angle of the reflecting surface is discontinuous when the position of the reflecting surface is 0° (360°). Thus, for convenience of description, inclination angles when the position of the reflecting surface is 1° and when the position of the reflecting surface is 359° are illustrated in FIG. 9A.

When the base 211 is rotated in an R direction by the motor, the reflecting surface 213 also rotates about the rotation axis AX, and thus, an angular coordinate of a portion irradiated with laser beams at the beam irradiation position 214 illustrated in FIG. 8A continuously changes as follows: 0°→90°→180°→360° (=0°)→90° . . . .

Even though the portion of the reflecting surface irradiated with the laser beams changes due to the rotation of the reflecting surface, the incident beams are always incident on the reflecting surface 213 at an angle of $\alpha$ with respect to the axis BX as illustrated in FIG. 9A. Meanwhile, the inclination angle of the reflecting surface changes in the range of $-\theta$ to $+\theta$ depending on the position of the reflecting surface. Therefore, as illustrated in FIG. 9A, the direction of the laser beam reflected by the reflecting surface 213 changes within an angular range of 40 from ($\alpha-2\times\theta$) to ($\alpha+2\times\theta$) with reference to the axis BX. That is, the inclination angle is formed in such a manner that when the optical surface (reflecting surface) is continuously rotated at a constant speed, the laser beams are recursively deflected in a constant direction at a constant deflection speed.

In other words, as illustrated in FIG. 8B, the deflector 210 can deflect output beams for scanning within an angular range from RD1 (($\alpha-2\times\theta$) with respect to the axis BX) to RD2 (($\alpha+2\times\theta$) with respect to the axis BX). When the reflecting surface 213 is continuously rotated in the R direction in FIG. 8A, the output beams are continuously deflected (for scanning) from RD1 toward RD2 in FIG. 8B. When reaching RD2, the output beams instantaneously return to RD1 and are deflected (for scanning) toward RD2 again. If the reflecting surface 213 is rotated in a direction opposite to the R direction, the output beams are continuously deflected (for scanning) from RD2 toward RD1 in FIG. 8B. When reaching RD1, the output beams instantaneously return to RD2 and are deflected (for scanning) toward RD1 again.

As described above, the deflector 210 is capable of recursively deflecting laser beams for scanning in a predetermined direction at a constant speed, by a simple driving method of continuously rotating the rotary member at a constant speed. As will be described below, by controlling the motor 212 to rotate in synchronization with a timing at which the reflective light modulation element 340 is driven (alternatively, an image signal input to the reflective light modulation element 340), illumination light can be scanned in a V direction on the screen of the reflective light modulation element 340.

When the present invention is carried out, a galvano-mirror may be used instead of the deflector 210 including the rotary member. However, the use of the galvano-mirror is expected to increase the size of the device, generate vibrations, increase costs, etc. Thus, it is preferable to use the deflector 210 including the rotary member.

Figure 10A:
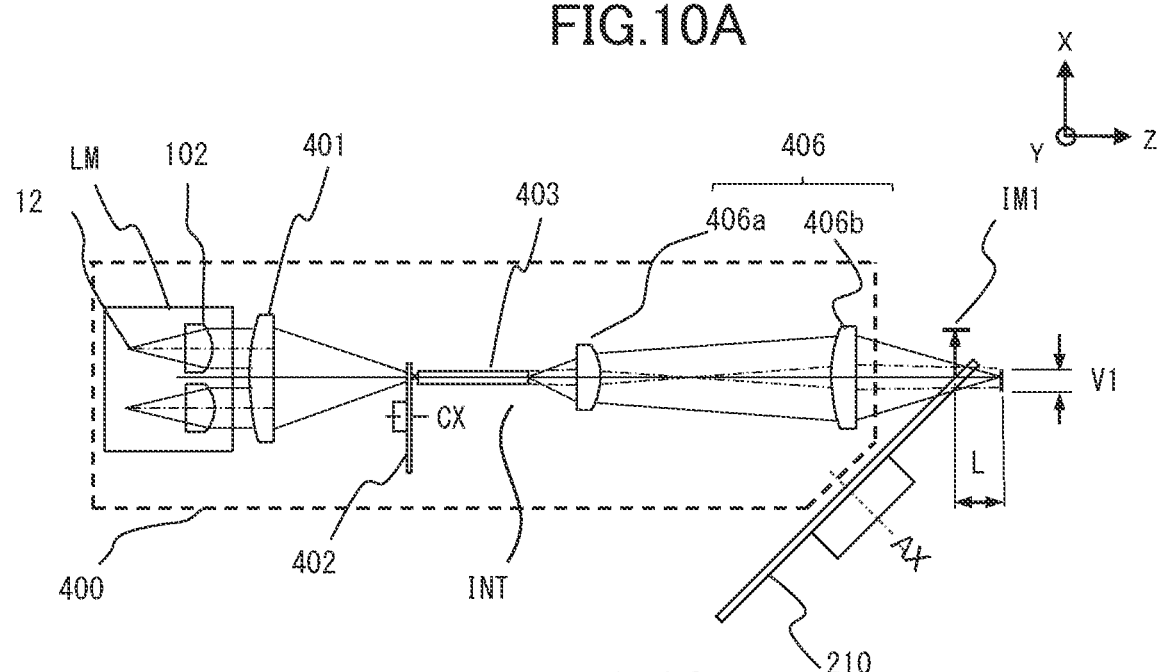
FIG. 10A is a diagram illustrating a positional relationship between the deflector 210 and the rectangular irradiation region IM1.
Figure 10B:
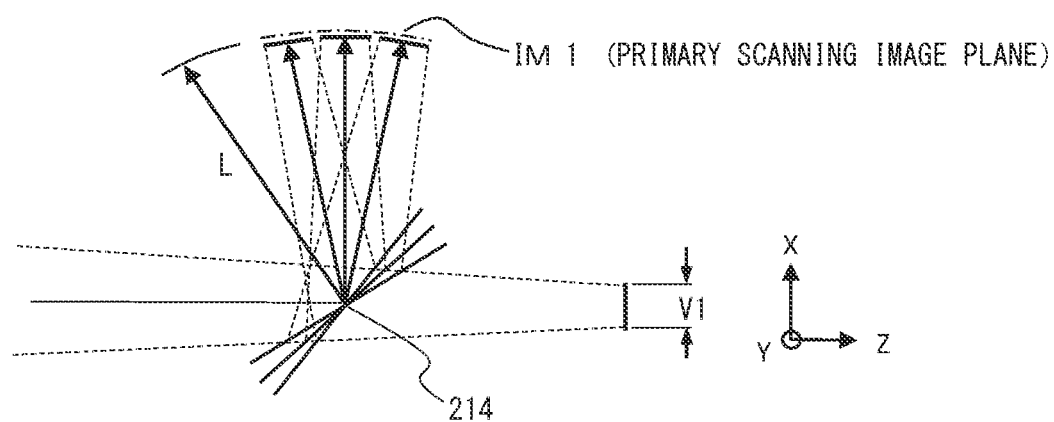
FIG. 10B is an enlarged view of the vicinity of a beam irradiation position 214 on the reflecting surface.
Figure 10C:
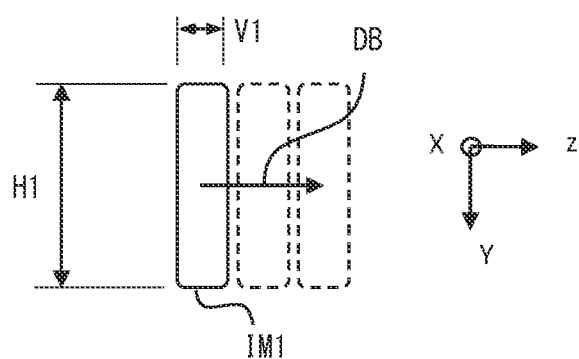
FIG. 10C is a diagram illustrating that a blue rectangular irradiation region IM1 is deflection-scanned in a DB direction.

FIG. 10A illustrates a positional relationship between the deflector 210 and the rectangular irradiation region IM1 formed ahead of the deflector 210. The coordinate system is illustrated based on the B light source. FIG. 10B illustrates an enlarged view of the vicinity of the beam irradiation position 214 on the reflecting surface. The beam irradiation position 214 of the reflecting surface is disposed to be closer to the light source than the rectangular irradiation region IM1 by a distance L. As illustrated in FIG. 10C, the blue rectangular irradiation region IM1 is deflection-scanned in a DB direction according to the rotation of the deflector 210.

As for the method for manufacturing the deflector 210, the disk-shaped base 211 provided with the band-shaped reflecting surface 213 along the circumference can be manufactured at low cost by processing a metal base material, for example, using a press extrusion method. As exemplified in FIG. 9A, there are a portion protruding from the main surface of the base 211 and a portion recessed from the main surface of the base 211 in the vicinity of the reflecting surface 213, but in order to improve the rotation balance, it is preferable to form the deflector 210 to have a shape having the same cross-sectional area at any position in a cross section passing through the rotation axis AX. In addition, the maximum height protruding from the main surface of the base 211 and the maximum depth recessed from the main surface of the base 211 are preferably ¾ or less of the average plate thickness in order to reduce wind noise. Specifically, the average plate thickness of the base 211 is preferably 0.7 mm or more and 2 mm or less, and θ is preferably 3° or more and 6° or less.

The rectangular irradiation regions IM1 of the respective colors formed by B, G, and R laser beams are deflection-scanned in the DB, DG, and DR directions, respectively, by the deflector described above, as illustrated in FIG. 1. Here, the description of the B deflector 210B, the G deflector 210G, and the R deflector 210R illustrated in FIG. 1 will be supplemented. The B deflector 210B rotates in the direction opposite to the R direction illustrated in FIG. 8A to deflection-scan the rectangular irradiation region IM1 formed by the B beams in the DB direction illustrated in FIG. 1. The G deflector 210G rotates in the direction opposite to the R direction illustrated in FIG. 8A to deflection-scan the rectangular irradiation region IM1 formed by the G beams in the DG direction illustrated in FIG. 1. The R deflector 210R rotates in the direction opposite to the R direction illustrated in FIG. 8A to deflection-scan the rectangular irradiation region IM1 formed by the R beams in the DR direction illustrated in FIG. 1.

The beams of the respective colors deflected for scanning by the B deflector 210B, the G deflector 210G, and the R deflector 210R are guided to the dichroic mirror 224 constituting the light synthesis unit. The B beams deflected for scanning by the B deflector 210B are guided to the dichroic mirror 224 constituting the light synthesis unit via the front transfer lens 201B, a dichroic mirror 223, and an optical path conversion mirror 330a. Here, the dichroic mirror 223 has an optical characteristic of transmitting the B beams but reflecting the G beams, and the optical path conversion mirror 330a has an optical characteristic of reflecting the B beams and the G beams. The G beams deflected for scanning by the G deflector 210G are guided to the dichroic mirror 224 constituting the light synthesis unit via the front transfer lens 201G, the dichroic mirror 223, and the optical path conversion mirror 330a. The R beams deflected for scanning by the R deflector 210R are guided to the dichroic mirror 224 constituting the light synthesis unit via the front transfer lens 201R.

Light Synthesis Unit

As already described in the section for the overall configuration, the dichroic mirror 224 constituting the light synthesis unit has an optical characteristic of transmitting the R beams and reflecting the B beams and the G beams. The optical elements are arranged in such a manner that the optical axis center of a front transfer lens 201B for B beams, the optical axis center of a front transfer lens 201G for G beams, and the optical axis center of a front transfer lens 201R for R beams overlap each other on the dichroic mirror 224, The traveling directions of the B beams (dotted line), the G beams (solid line), and the R beams (alternate long and short dash line) are all aligned in the Z-plus direction, that is, a direction toward a rear transfer lens 202, by the light synthesis unit.

Transfer Optical System

The rectangular irradiation region IM1 formed by the laser beams for each color is transferred in an enlarged manner as a rectangular secondary transfer image IM2 by a first transfer lens (first transfer optical system) including each of the front transfer lens 201B, the front transfer lens 201G, the front transfer lens 201R provided for each color, and the rear transfer lens 202 shared by all of the colors. Each of the front transfer lens 201 and the rear transfer lens 202 is a convex lens having positive power. An optical path length of the first transfer optical system, that is, a distance from the rectangular irradiation region IM1 to the rectangular secondary transfer image IM2, can be formed to be equal between all of the colors.

Figure 11A:
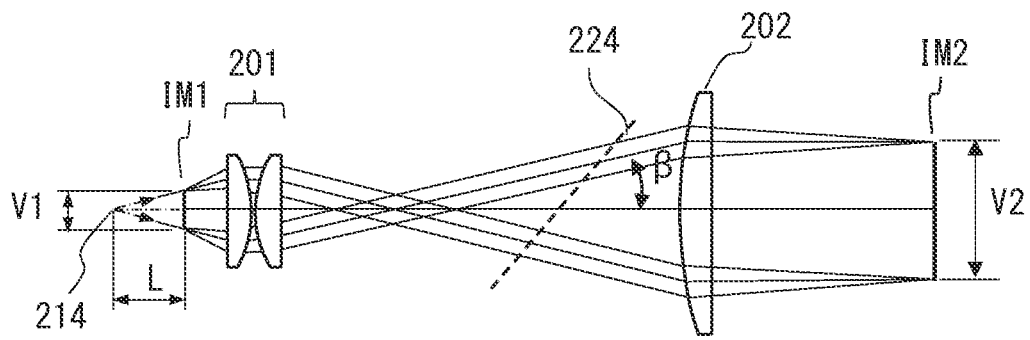
FIG. 11A is a schematic diagram for explaining the functions of a front transfer lens 201 and a rear transfer lens 202.

FIG. 11A is a schematic diagram for explaining the functions of the front transfer lens 201 and the rear transfer lens 202. As illustrated, the rectangular irradiation region IM1 is transferred in an enlarged manner as a rectangular secondary transfer image IM2. The position at which the rectangular secondary transfer image IM2 is formed is set to a position of a diffusion plate 310a as illustrated in FIG. 1.

Then, the secondary transfer image IM2 scattered by the diffusion plate 310a is transferred in an enlarged manner as a tertiary transfer image IM3 onto the screen of the reflective light modulation element 340 by a second transfer optical system 320. The second transfer optical system 320 includes a front transfer lens 321 and a rear transfer lens 322 disposed with the optical path conversion mirror 330 interposed therebetween. The sizes of the transfer images are typically set in the following relationship.

IM1:IM2:IM3=1:2:6

According to the present embodiment having such a configuration, it is easy to control the F-number of illumination light for illuminating the reflective light modulation element 340.

In FIG. 1, the diffusion plate 310a is fixed at a predetermined position. However, the laser beam-irradiated position on the diffusion plate may move with time, for example, by rotating or linearly reciprocating the diffusion plate. According to such a form, scintillation of illumination light by a laser can be suppressed.

Figure 11B:
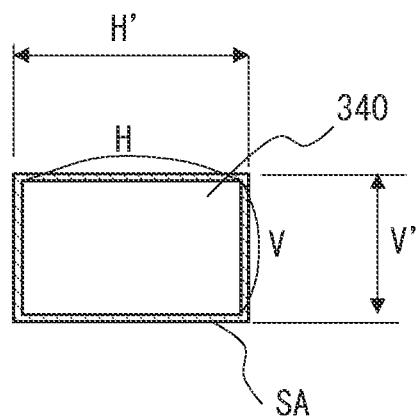
FIG. 11B illustrates a relationship between a screen of a reflective light modulation element 340 and a scanning range SA of rectangular laser beams.

FIG. 11B illustrates a relationship between the screen of the reflective light modulation element 340 and the scanning range SA of rectangular laser beams. Assuming that the screen size of the reflective light modulation element 340 is H (horizontal direction)×V (vertical direction), the scanning range SA of the rectangular laser beams covers a region of H'×V" larger than the screen size. Note that the scanning range SA of the rectangular laser beams is enlarged at the transfer magnification described above with respect to the scanning range in which the rectangular irradiation region IM1 is scanned by the deflector 210.

Figure 11C:
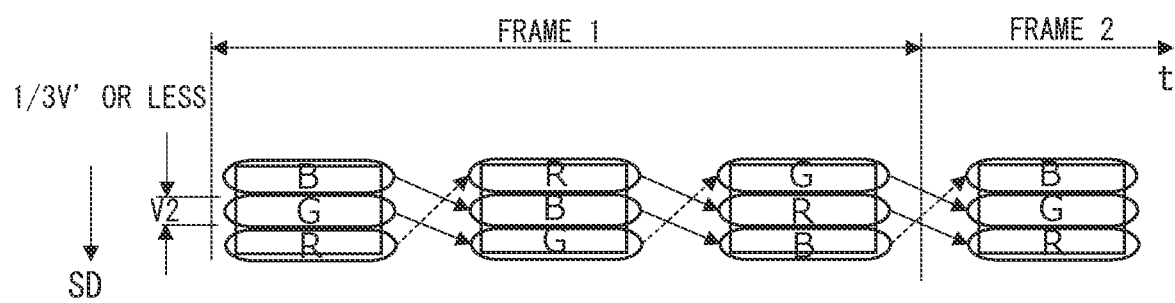
FIG. 11C is a diagram illustrating how the screen of the reflective light modulation element 340 is irradiated with each of the rectangular B, G, and R beams with the horizontal axis as the time axis.

FIG. 11C is a diagram illustrating how the screen of the reflective light modulation element 340 is irradiated with each of the rectangular B, G, and R beams with the horizontal axis as the time axis. The B beams, the G beams, and the R beams vertically scan the screen of the reflective light modulation element 340 along a scanning direction SD, and complete scanning of one screen in one frame period. The B beams, the G beams, and the R beams are formed not to be superimposed each other so that color mixing does not occur at a boundary portion between the respective color regions, and a width V2 of each beam in the vertical direction is necessarily formed to be ⅓ or less of V'. The width of each beam in the vertical direction can be set to ⅙ or more and ⅓ or less of the width of the screen of the reflective light modulation element 340 in the vertical direction.

As described above, in the projection-type display device of the present embodiment, a plurality of illumination units each including a semiconductor laser, a collimator lens, an integrator illumination system, and a deflection element are provided for beams of different colors, respectively, and a light synthesis unit that synthesizes illumination beams output from the illumination units for the beams of different colors. The rectangular irradiation regions output from the illumination units for the beams of different colors are transferred in an enlarged manner to the reflective light modulation element while being deflection-scanned so as not to be superimposed on each other.

In the illumination system of the projection-type display device according to the present embodiment, the light diffusing element including a dynamic diffusing surface is disposed between the laser light source and the incident surface of the integrator optical system. Specifically, as illustrated in FIG. 5, the light diffusing element 402 is disposed between the laser module LM and the incident surface INP of the rod integrator 403. By moving the portion of the light diffusing surface DIF irradiated with laser beams at an appropriate speed after the above-described arrangement is set, it is possible to reduce the temporal and spatial coherence between the laser beams incident on the integrator optical system. As a result, when beams are superimposed in the integrator optical system, it is possible to suppress interference between the beams and generation of bright and dark distribution such as interference fringes. By moving the diffusing surface at an appropriate speed, it is possible to make effective illuminance distribution in the rectangular irradiation region IM1 extremely uniform in terms of human visual characteristics. Therefore, according to the present embodiment, by transferring the rectangular irradiation region IM1 in which illuminance is uniform to illuminate the screen of the reflective light modulation element, it is possible to display a projected image with high image quality.

In the present embodiment, the laser beams of three colors of B, G, and R are diffused by the single light diffusing element 402 rotated by the single motor 412. Therefore, the number of components can be reduced as compared with that in a case where a motor and a light diffusing element are provided for each color. In addition, by sharing a rod integrator for B beams and G beams in the integrator illumination system, the number of components can be reduced, and the space occupied by the optical path can be compact. Therefore, it is possible to realize a compact projection-type display device at low cost.

According to the present embodiment, in the field related to a projection-type image display device that modulates a laser beam according to an image signal and projects the modulated laser beam, it is possible to realize a device that is small in size, is easy to drive and control, and has high light use efficiency.

Second Embodiment

Figure 13:
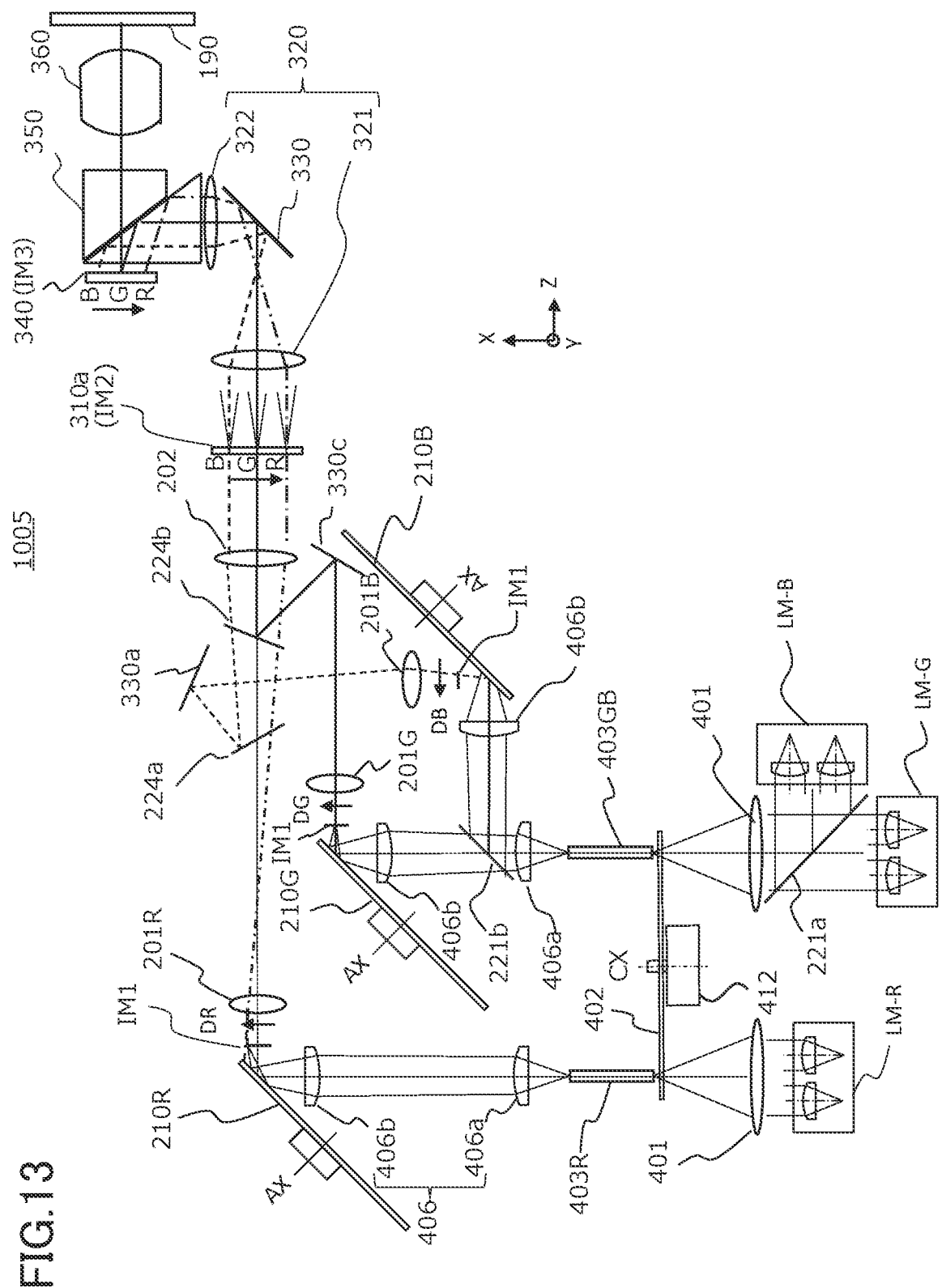
FIG. 13 is a diagram of a basic configuration portion of an integrator illumination system INT according to a second embodiment as viewed from one direction.

A projection-type display device 1005 according to a second embodiment will be described with reference to FIG. 13. The description of parts common to the first embodiment will be simplified or omitted.

The projection-type display device 1005 according to the present embodiment has a configuration similar to that of the projection-type display device 1004 according to the first embodiment described with reference to FIG. 1, but differs from the projection-type display device 1004 according to the first embodiment in a configuration of a light synthesis unit. In the first embodiment, the B beams and the G beams are guided to the single dichroic mirror 224 to be reflected and synthesized with the transmitted R beams. However, in the present embodiment. B beams and G beams are synthesized using a dichroic mirror 224a and a dichroic mirror 224b.

Light Synthesis Unit

The dichroic mirror 224a has an optical characteristic of transmitting R beams but reflecting B beams, and the dichroic mirror 224b has an optical characteristic of transmitting R beams and B beams but reflecting G beams. First, the R beams and the B beams are synthesized by the dichroic mirror 224a, and then, the G beams guided via an optical path conversion mirror 330c is additionally synthesized by the dichroic mirror 224b. On the dichroic mirror 224b, the optical elements are arranged in such a manner that the optical axis center of a front transfer lens 201B for B beams, the optical axis center of a front transfer lens 201G for G beams, and the optical axis center of a front transfer lens 201R for R beams overlap with each other. The traveling directions of the B beams (dotted line), the G beams (solid line), and the R beams (alternate long and short dash line) are all aligned in the Z-plus direction, that is, a direction toward a rear transfer lens 202, by the light synthesis unit.

Transfer Optical System

The rectangular irradiation region IM1 formed by the laser beams for each color is transferred in an enlarged manner as a rectangular secondary transfer image IM2 by a first transfer lens (first transfer optical system) including each of the front transfer lens 201B, the front transfer lens 201G, the front transfer lens 201R provided for each color, and the rear transfer lens 202 shared by all of the colors. Each of the front transfer lens 201 and the rear transfer lens 202 is a convex lens having positive power. An optical path length of the first transfer optical system, that is, a distance from the rectangular irradiation region IM1 to the rectangular secondary transfer image IM2, can be formed to be equal between all of the colors.

In the present embodiment, as compared with the first embodiment, the position of the R deflector 210R is laid out in the X-axis minus direction, and the position of the B deflector 210B is laid out in the X-axis plus direction. Then, in order to deflect the rectangular irradiation regions IM1 of the respective colors to the deflection directions DB, DG, and DR illustrated in FIG. 13, all of the B deflector 210B, the G deflector 210G, and the R deflector 210R rotate in the R direction illustrated in FIG. 8A.

In addition to the effect similar to that of the first embodiment, the present embodiment is capable of reducing a dimension of the projection-type display device in the X direction occupied by an optical path space, thereby making the projection-type display device to have a compact outer shape in the X direction.

Third Embodiment

A projection-type display device 1006 according to a third embodiment will be described with reference to FIG. 14. The description of parts common to the first embodiment or the second embodiment will be simplified or omitted.

Similarly to the projection-type display device 1004 according to the first embodiment, the projection-type display device 1006 according to the present embodiment includes an integrator optical system including a movable light diffusing element, a light synthesis unit, and a transfer optical system. However, as illustrated in FIG. 14, the present embodiment is different in that the rotation axis CX of the light diffusing element 402, the axial direction of the rod integrator 403R, and the axial direction of the rod integrator 403GB are arranged along the Z direction.

Then, in order to deflect the rectangular irradiation regions IM1 of the respective colors to the deflection directions DB. DG, and DR illustrated in FIG. 14, in the present embodiment, the B deflector 210B rotates in the R direction illustrated in FIG. 8A, and the G deflector 210G and the R deflector 210R rotate in a direction opposite to the R direction illustrated in FIG. 8A.

As for the light synthesis unit, similarly to the first embodiment, the B beams and the G beams are guided to the single dichroic mirror 224 to be reflected and synthesized with the transmitted R beams. However, the present embodiment is different from the first embodiment in a configuration of an optical path for guiding each color to the dichroic mirror 224. In the present embodiment, the traveling direction of the R beams deflected by the R deflector 210R is changed from the X-minus direction to the Z-plus direction using an optical path conversion mirror 330b, and the R beams are incident on the dichroic mirror 224.

Figure 14:
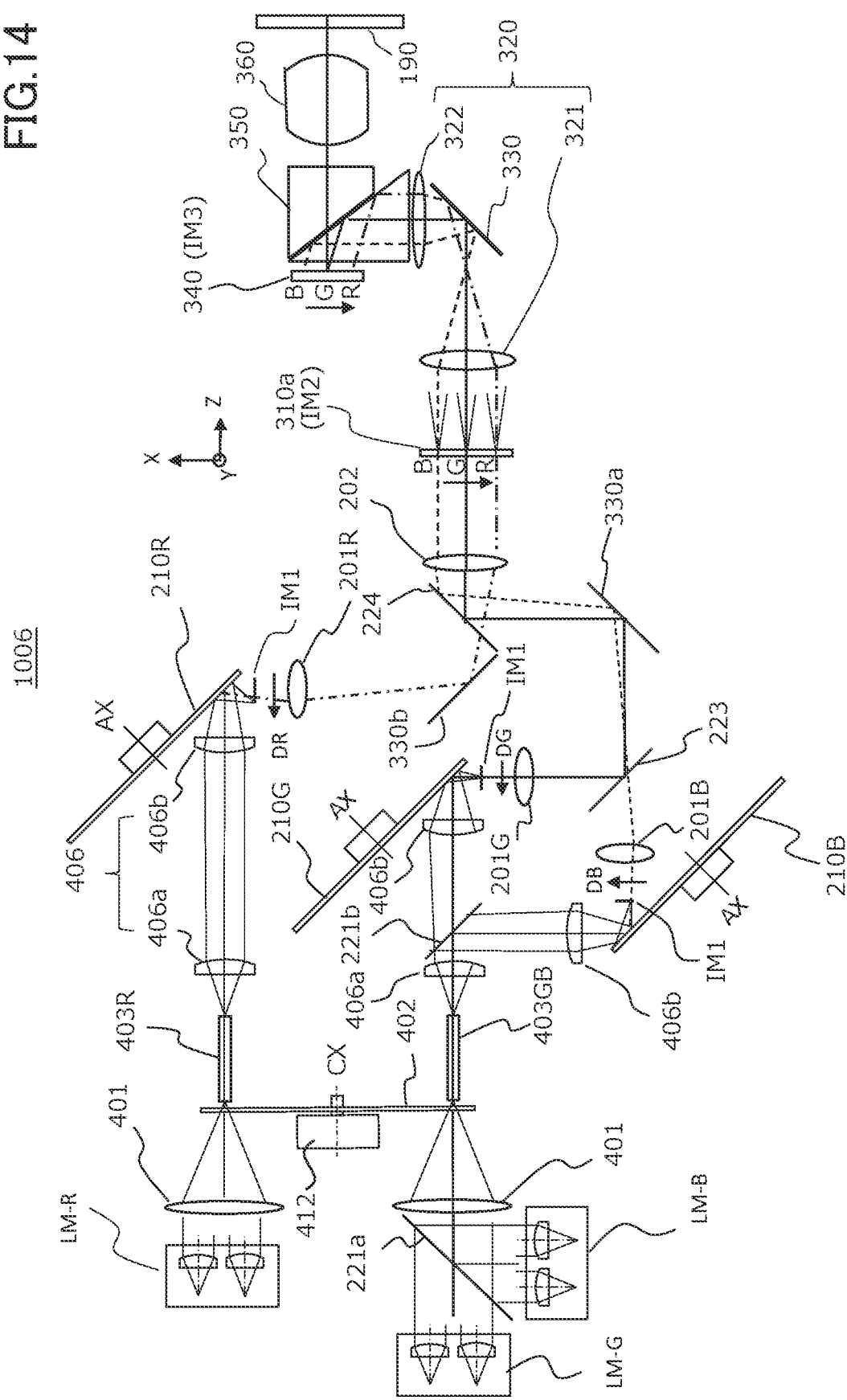
FIG. 14 is a diagram illustrating a schematic configuration of an optical system of a projection-type display device according to a third embodiment.

In addition to the effect similar to that of the first embodiment, the present embodiment is capable of reducing a dimension of the projection-type display device in the X direction occupied by an optical path space by placing the laser module LM-B, the laser module LM-G, and the laser module LM-R on the left side as illustrated in FIG. 14, thereby making the projection-type display device to have a compact outer shape in the X direction.

Fourth Embodiment

A projection-type display device 1007 according to a fourth embodiment will be described with reference to FIG. 15. The description of parts common to the first embodiment will be simplified or omitted.

In the first to third embodiments, since the deflectors, each being rotated by the motor, are individually provided in the optical paths of the B beams, the G beams, and the R beams, the number of components constituting the deflection mechanism is relatively large. In the present embodiment, as illustrated in FIG. 15, B, G, and R beams are deflected for scanning using a deflector 210a including a single motor and a single rotary member.

Deflector

Figure 15:
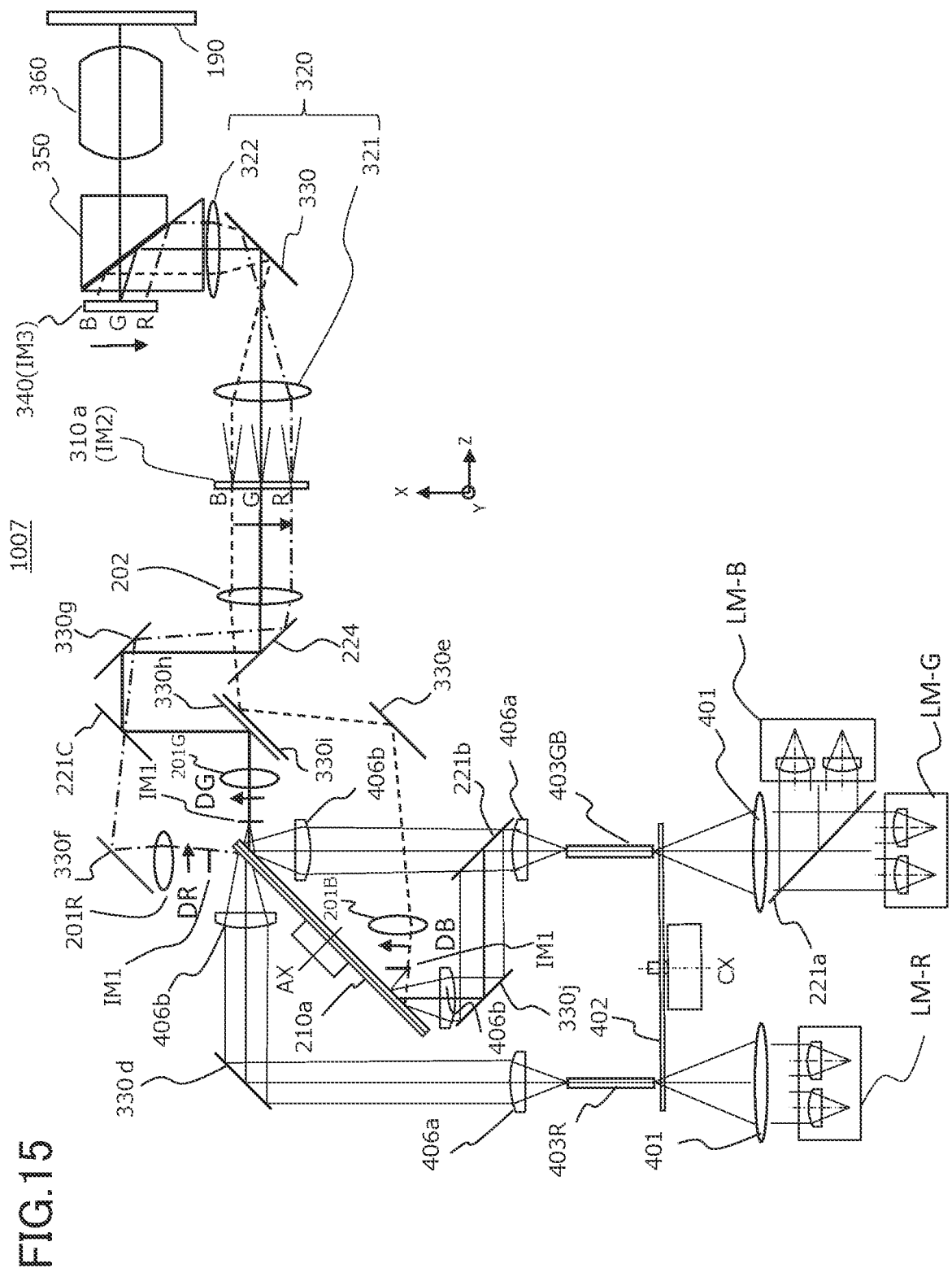
FIG. 15 is a diagram illustrating a schematic configuration of an optical system of a projection-type display device according to a fourth embodiment.

As illustrated in FIG. 15, the deflector 210a is disposed between the rear convex lens 406b of the relay lens for each of the colors corresponding B beams, G beams, and R beams and the rectangular irradiation region IM1 for each color. The deflector 210a is a deflection element capable of deflection-scanning three rectangular irradiation regions alone.

Figure 16A:
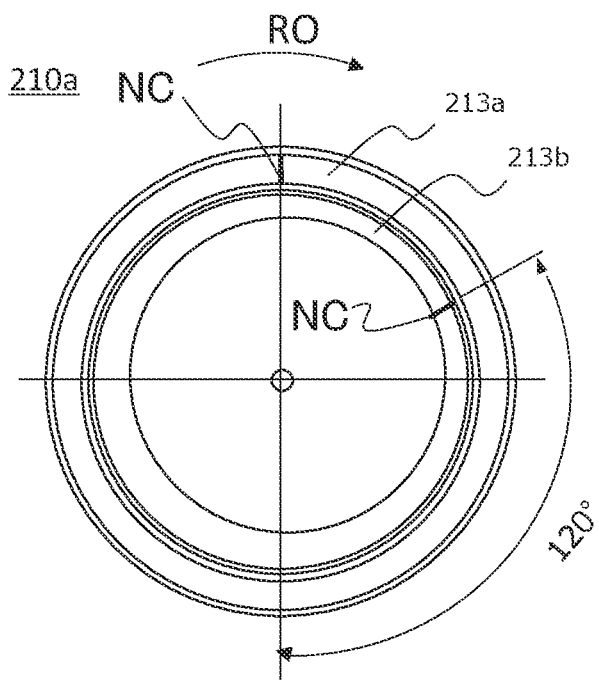
Figure 16B:
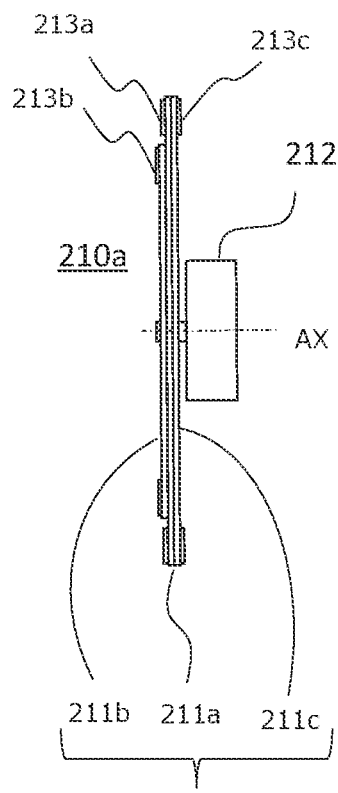
Figure 16C:
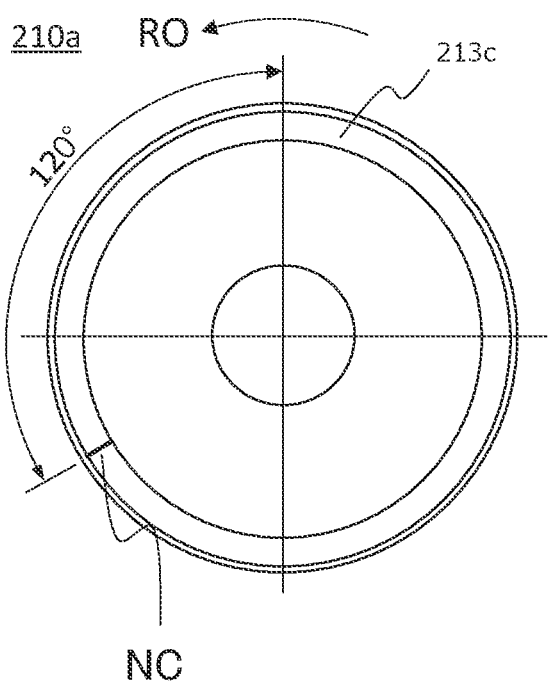

FIG. 16A is a top view of the deflector 210a viewed from a side where the rear convex lens 406b for B beams and the rear convex lens 406b for G beams are disposed. FIG. 16B is a side view of the deflector 210a viewed from a direction orthogonal to the rotation axis AX, and FIG. 16C is a bottom view of the deflector 210a viewed from a side where the rear convex lens 406b for R beams is disposed. In FIGS. 16A and 16C, a rotation direction is denoted by RO.

As illustrated in FIG. 16A, a reflecting surface 213a and a reflecting surface 213b, which are band-shaped optical surfaces, are provided on an upper surface of the disk-shaped base 211. The reflecting surface 213a and the reflecting surface 213b are provided along concentric circles having different radii around the rotation axis AX. As illustrated in FIG. 16C, a reflecting surface 213c, which is a belt-shaped optical surface, is provided on a lower surface of the disk-shaped base 211 along a circle having the rotation axis AX at the center thereof.

As illustrated in FIG. 16B, the disk-shaped base 211 is formed by stacking and integrating a substrate 211a, a substrate 211b, and a substrate 211c each having a reflecting surface formed thereon. However, the base 211 is not necessarily formed by stacking and integrating three substrates, and may have a structure, for example, as illustrated in a side view of each of FIGS. 17A to 17C. FIG. 17A illustrates an example in which the base 211 is formed by stacking and integrating a substrate 211a provided with the reflecting surface 213a and the reflecting surface 213b on one side thereof, and a substrate 211c on which the reflecting surface 213c is provided. FIG. 17B illustrates an example in which the base 211 is formed by stacking and integrating a substrate 211c on which the reflecting surface 213a and the reflecting surface 213c are provided, and a substrate 211b on which the reflecting surface 213b is provided. FIG. 17C illustrates an example in which the reflecting surface 213a, the reflecting surface 213b, and the reflecting surface 213c are formed on the base 211, which is originally a single substrate.

Similarly to the reflecting surface 213 described with reference to FIGS. 8A to 9B, each reflecting surface is formed as an inclined surface that enables laser beams to be recursively deflected for scanning in a predetermined direction at a constant speed. Meanwhile, in order to prevent the G beams deflected for scanning by the reflecting surface 213a, the B beams deflected for scanning by the reflecting surface 213b, and the R beams deflected for scanning by the reflecting surface 213c from being superimposed on each other when synthesized by the light synthesis unit 220, the reflecting surfaces are formed in such a manner that inclination start/end points in the respective reflecting surfaces, that is, positions NC where the inclination angles of the reflecting surfaces are discontinuous, are shifted from each other when viewed along the circumferential direction.

As can be seen with reference to FIG. 15, on the upper surface of the deflector 210a a position irradiated with the B beams is opposite to a position irradiated with the G beams across the rotation axis AX. In addition, a position irradiated with the R beams on the lower surface of the deflector 210a is opposite to a position irradiated with the B beams on the upper surface of the deflector 210a across the rotation axis AX. The inclinations of the respective reflecting surfaces are set in such a manner that when the beams of the respective colors reflected at the respective irradiation positions are synthesized by the dichroic mirror 224 serving as the light synthesis unit, deflection-scanning phases are shifted from each other by 120 degrees. For example, in FIG. 16A, when the position NC where the inclination of the reflecting surface 213a is discontinuous is a position corresponding to 12:00 of the clock, the position NC where the inclination of the reflecting surface 213b is discontinuous is a position corresponding to 2:00 of the clock. At that time, in FIG. 16C, the position NC where the inclination of the reflecting surface 213c is discontinuous is a position corresponding to 8:00 of the clock. In addition, the rotation direction RO of the base 211 is apparently shown in reverse between the upper surface illustrated in FIG. 16A and the lower surface illustrated in FIG. 16C. As described above, in order to prevent the rectangular illumination regions from being superimposed on each other when they are scanned in a recursively deflected manner, at irradiation positions on the disk of the deflector, the reflecting surfaces are formed in such a manner that phases of changes in inclination angle are shifted from each other along the rotation direction.

In the present embodiment, in order to guide the B beams deflected by the deflector 210a to the dichroic mirror 224 serving as the light synthesis unit, a front transfer lens 201B for B, an optical path conversion mirror 330e, and an optical path conversion mirror 330i are provided. In addition, in order to guide the G beams deflected by the deflector 210a to the dichroic mirror 224 serving as the light synthesis unit, a front transfer lens 201G for G, an optical path conversion mirror 330h, a dichroic mirror 221c, and an optical path conversion mirror 330g are provided. The dichroic mirror 221c is shared by the G beams and the R beams because it has an optical characteristic of reflecting the G beams and transmitting the R beams. In addition, in order to guide the R beams deflected by the deflector 210a to the dichroic mirror 224 serving as the light synthesis unit, a front transfer lens 201R for R, an optical path conversion mirror 330f, and the dichroic mirror 221c and the optical path conversion mirror 330g described above are provided.

In addition to the effect similar to that of the first embodiment, the present embodiment is capable of deflecting B, G, and R beams for scanning using the deflector 210a including a single motor and a single rotary member, thereby reducing the number of components for the deflection mechanism.

Fifth Embodiment

Figure 18:
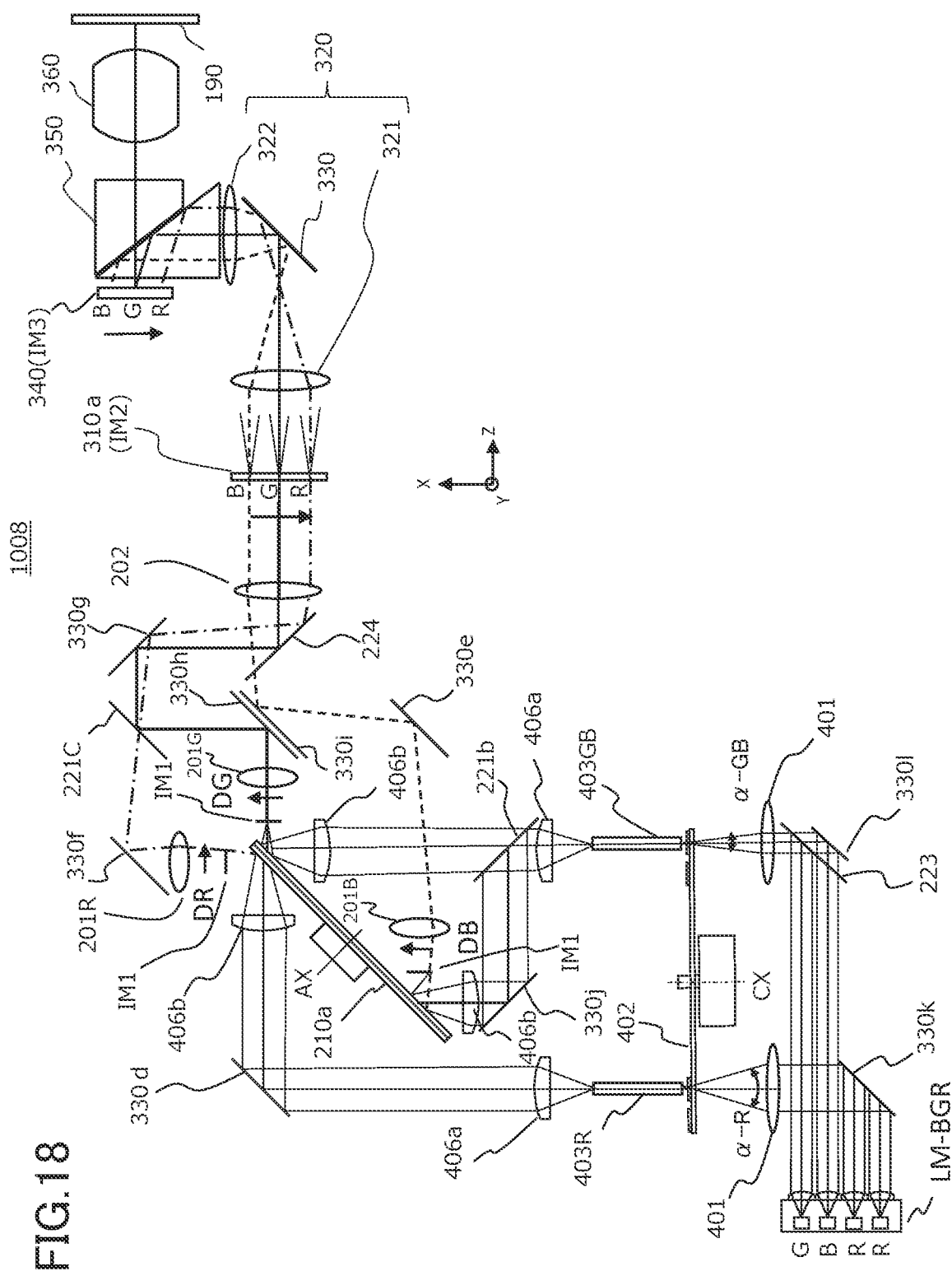
FIG. 18 is a diagram illustrating a schematic configuration of an optical system of a projection-type display device according to a fifth embodiment.

A projection-type display device 1008 according to a fifth embodiment will be described with reference to FIG. 18. The present embodiment is identical to the fourth embodiment in that a deflector 210a including a single motor and a single rotary member is used, and the description of parts common to the fourth embodiment will be simplified or omitted.

In the above-described embodiments including the fourth embodiment, the laser module LM-B for B, the laser module LM-G for G. and the laser module LM-R for R are individually laid out. However, in the present embodiment, a laser module LM-BGR in which the laser modules of three colors are integrated is provided.

Figure 19A:
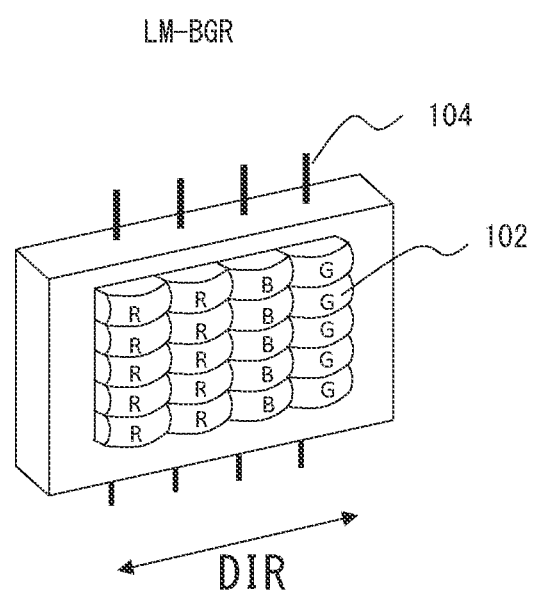
FIG. 19A is a perspective view illustrating an appearance of a laser module LM-BGR.

FIG. 19A is a perspective view illustrating an appearance of the laser module LM-BGR. In the laser module LM-BGR, pairs each including a semiconductor laser and a collimator lens 102 are two-dimensionally arranged in a matrix of 4×5, but the arrangement is not necessarily limited to a matrix of 4×5, and the number of rows or columns can be appropriately changed. Note that a terminal 104 is a power supply terminal for supplying power to semiconductor lasers in each column.

In order to make the elements for the semiconductor lasers for the same color to have a uniform light emission luminance, it is general that the semiconductor lasers for the same color are arranged in the same column, and are electrically connected to each other in series. In addition, since the R-beam emitting semiconductor lasers have a lower light emission luminance than the B-light emitting semiconductor lasers and the G-beam emitting semiconductor lasers. Thus, in order to improve white balance of illumination light, the number of elements for the R-beam emitting semiconductor lasers is larger than the number of elements for the B-light emitting semiconductor lasers or the G-beam emitting semiconductor lasers.

In the example of FIG. 19A, the laser module LM-BGR includes red semiconductor lasers R in two vertical columns, blue semiconductor lasers B in one vertical column, and green semiconductor lasers G in one vertical column.

Figure 19B:
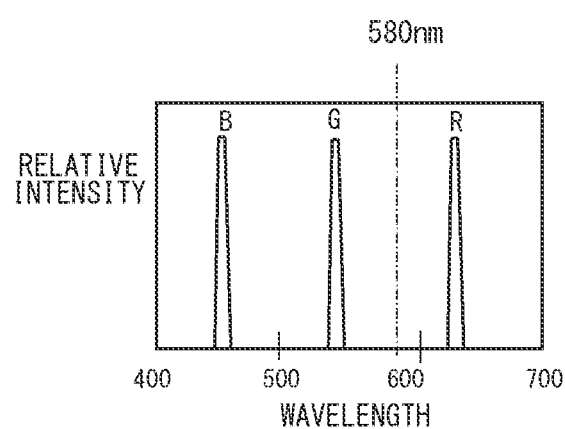
FIG. 19B is a diagram exemplifying wavelengths of beams output from semiconductor lasers of respective colors.

FIG. 19B illustrates wavelengths of beams output from the semiconductor lasers of the respective colors used in the present embodiment. The beam output from the blue semiconductor laser B is included in a wavelength range of 440 (nm) to 465 (nm), the beam output from the green semiconductor laser G is included in a wavelength range of 520 (nm) to 560 (nm), and the beam output from the red semiconductor laser R is included in a wavelength range of 620 (nm) to 650 (nm). Note that, due to manufacturing variations or the like, output wavelengths of individual semiconductor lasers mounted in the laser module may vary by about 10 nm within the above-described wavelength range. It is also possible to set the light emission wavelength of the semiconductor laser within a wavelength range other than that described above.

In the projection-type display device 1008 (FIG. 18), the laser module LM-BGR is installed in such a manner that DIR is along the X direction, the DIR being a direction in which the semiconductor lasers of different light emission colors are arranged in the laser module LM-BGR. As a result, the laser beams of the respective colors output from the laser module LM-BGR advance in the Z-plus direction.

The B beams output from the laser module LM-BGR are incident on the dichroic mirror 223 having an optical characteristic of transmitting the B beams but reflecting the G beams. After transmitting the dichroic mirror 223, the traveling direction of the B beams is changed to the X-plus direction by an optical path conversion mirror 330l, and the B beams are transmitted again through the dichroic mirror 223. Then, the B beams are incident on the condenser lens 401 shared by B and G, and are condensed toward the light diffusing element 402.

The G beams output from the laser module LM-BGR are reflected by the dichroic mirror 223 having an optical characteristic of transmitting the B beams but reflecting the G beams. As the G beams are reflected, the traveling direction of the G beams is changed to the X-plus direction. Then, the G beams are incident on the condenser lens 401 shared by B and G and condensed toward the light diffusing element 402.

The R beams output from the laser module LM-BGR are reflected by an optical path conversion mirror 330k, the traveling direction of the R beams is changed to the X-plus direction. Then, the R beams are incident on the condenser lens 401 for R, and are condensed toward the light diffusing element 402.

Here, the R beams output from the laser module LM-BGR are emitted from semiconductor elements in two columns, and the B beams are emitted from semiconductor elements in one column and the G beams are emitted from semiconductor elements in one column. Therefore, when comparing an angle α-R at which the R beams are converged by the condenser lens 401 with an angle α-GB at which the B beams and the G beams are converged by the condenser lens 401, the angle α-R is larger than the angle α-GB.

Figure 12B:
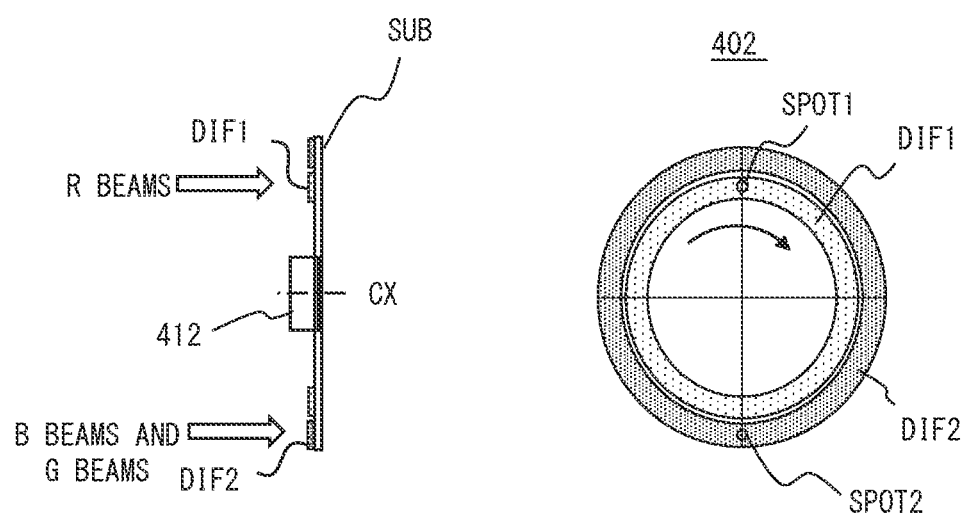
FIG. 12B illustrates a side view and a top view of another light diffusing element 402 according to the embodiment.

In the present embodiment, a light diffusing element 402 including a diffusing surface DIF1 and a diffusing surface DIF2 having different diffusion characteristics, which has been described with reference to FIG. 12B, is used. That is, the light diffusing element 402 is configured in such a manner that the diffusing surface DIF2 has a larger diffusing power than the diffusing surface DIF1, the B beams and the G beams are diffused using the diffusing surface DIF2, and the R beams are diffused using the diffusing surface DIF1. As a result, the scattering characteristics of the B beams, the G beams, and the R beams can be uniform after being transmitted through the light diffusing element 402, thereby improving color balance of illumination light illuminating the reflective light modulation element 340.

The optical layout beyond the light diffusing element 402 is substantially similar to that in the fourth embodiment.

In addition to the effect similar to that of the fourth embodiment, the present embodiment is capable of improving color balance while increasing the intensity of illumination light illuminating the reflective light modulation element 340, by using the laser module LM-BGR including a large number of R-beam semiconductor lasers.

Sixth Embodiment

A projection-type display device 1009 according to a sixth embodiment will be described with reference to FIG. 20. The present embodiment is identical to the fifth embodiment in many points, but is different in that the rotation axis CX of the light diffusing element 402, the axial direction of the rod integrator 403R, and the axial direction of the rod integrator 403GB are arranged along the Z direction as illustrated in FIG. 20. In addition, an optical system that synthesizes the rectangular irradiation regions IM1 of the respective colors deflected by the deflector 210a using the light synthesis unit 225 is also different from that in the fifth embodiment.

In the present exemplary embodiment, a dichroic mirror having an optical characteristic of transmitting B beams and G beams but reflecting R beams is used as the light synthesis unit 225. In order to guide the B beams deflected by the deflector 210a to the light synthesis unit 225, a front transfer lens 201B for B, an optical path conversion mirror 330e, and a dichroic mirror 223 having an optical characteristic of transmitting the B beams but reflecting the G beams are provided. In addition, in order to guide the G beams deflected by the deflector 210a to the light synthesis unit 225, a front transfer lens 201G for G, an optical path conversion mirror 330h, and the above-described dichroic mirror 223 are provided. Furthermore, in order to guide the R beams deflected by the deflector 210a to the light synthesis unit 225, a front transfer lens 201R for R and an optical path conversion mirror 330f are provided.

In addition to the effect similar to that of the fifth embodiment, the present embodiment is capable of reducing a dimension of the projection-type display device in the X direction occupied by an optical path space by placing the laser module LM-BGR on the left side as illustrated in FIG. 20, thereby making the projection-type display device to have a compact outer shape in the X direction.

Seventh Embodiment

A projection-type display device 1010 according to a seventh embodiment will be described with reference to FIG. 21. The description of parts common to any of the other embodiments will be simplified or omitted.

The projection-type display device 1010 according to the present embodiment is identical to the first embodiment in that the laser beams of three colors of B. G, and R are diffused by the single light diffusing element 402 rotated by the single motor 412. Therefore, the present embodiment is identical to the first embodiment in that the number of components can be reduced as compared with that in a case where a motor and a light diffusing element are provided for each color.

In the present embodiment, beams output from the laser module LM-B, the laser module LM-G, and the laser module LM-R are synthesized to be superimposed on each other in advance, and then are incident on the condenser lens 401 shared by B, G. and R to be condensed toward the light diffusing element 402. That is, the beams output from the laser module LM-B and the beams output from the laser module LM-G are synthesized by the dichroic mirror 231 having an optical characteristic of transmitting the G beams and reflecting the B beams. Further, the B beams, the G beams, and the R beams are synthesized by the dichroic mirror 232 having an optical characteristic of reflecting the B beams and the G beams and transmitting the R beams.

The B beams, the G beams, and the R beams emitted from the emission surface of the rod integrator 403 pass through the front convex lens 406a, which is a part of the relay lens, and then are separated into the B beams, the R beams, and the G beams by a cross prism 501 serving as a separation element.

After the optical path of the B beams separated by the cross prism 501 is changed by the optical path conversion mirror 330, the B beams pass through the rear convex lens 406b, which is a part of the relay lens, and are incident on the B deflector 210B for deflection. The B beams deflected by the B deflector 210B are incident on a cross prism 502 via the front transfer lens 201B.

The optical path of the R beams and the G beams separated by the cross prism 501 is changed by the optical path conversion mirror 330, and then the R beams and the G beams are incident on a dichroic mirror 233 having an optical characteristic of reflecting the G beams and transmitting the R beams. The G beams reflected by the dichroic mirror 233 pass through the rear convex lens 406b, which is a part of the relay lens, and are incident on the G deflector 210G for deflection. The G beams deflected by the G deflector 210G are incident on the cross prism 502 via the front transfer lens 201G. The R beams transmitted through the dichroic mirror 233 are incident on the R deflector 210R through the rear convex lens 406b, which is a part of the relay lens, for deflection. The R beams deflected by the R deflector 210R are incident on the cross prism 502 via the front transfer lens 201R.

The cross prism 502 changes the traveling direction of the B beams advancing in the X-plus direction to the Z-plus direction and changes the traveling direction of the R beams advancing in the X-minus direction to the Z-plus direction, while not affecting the traveling direction of the G beams advancing in the Z-plus direction. That is, similarly to the dichroic mirror 224 in the first embodiment, the cross prism 502 according to the present embodiment functions as a synthesis unit that synthesizes the B beams, the G beams, and the R beams. Since the configuration after the synthesis unit is similar to that in the first embodiment, the description thereof will be omitted.

In the present embodiment, since the rod integrator 403 is shared by the B beams, the G beams, and the R beams in the integrator illumination system, the number of components can be reduced. Therefore, it is possible to realize a compact projection-type display device at low cost.

Eighth Embodiment

An eighth embodiment, which is a modification of the first embodiment, will be described with reference to FIG. 22. The description of matters common to the first embodiment will be simplified or omitted.

In the example illustrated in FIG. 1, as described above, the single rotatable light diffusing element 402 is disposed in the vicinity of the incident surface of the rod integrator to dynamically diffuse B laser beams, G laser beams, and R laser beams. Here, if the light diffusing element 402 is used for the purpose of suppressing the light intake loss on the incident surface INP of the rod integrator 403 focused on an improvement in utilization efficiency, it is not necessary to configure the diffusing surface to be movable. That is, the B laser beams, the G laser beams, and the R laser beams may be diffused statically rather than dynamically.

Figure 22:
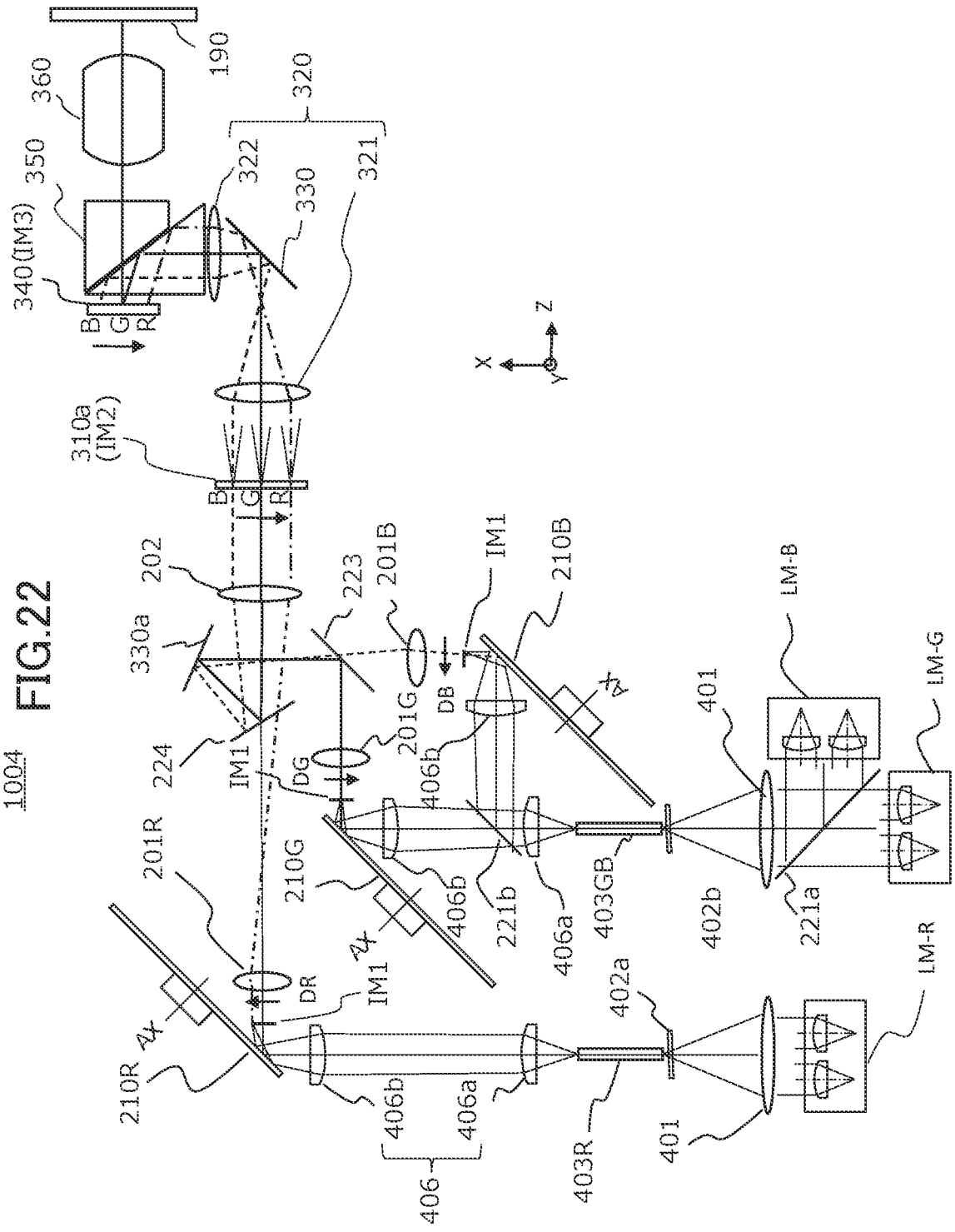
FIG. 22 is a diagram illustrating a schematic configuration of an optical system of a projection-type display device according to an eighth embodiment.

FIG. 22 illustrates an example of a projection-type image display device in which a light diffusing element 402a having a light diffusing surface having an area wider than the irradiation spot of laser beams R is fixedly disposed in the vicinity of the incident surface of the rod integrator 403R, and a light diffusing element 402b having a light diffusing surface having an area wider than any of the irradiation spots of laser beams G and laser beams B is fixedly disposed in the vicinity of the incident surface of the rod integrator 403GB. According to this embodiment, it is not necessary to install a drive mechanism (e.g., the motor 412 in FIG. 1) for dynamically moving the light diffusing elements, and as a result, it is possible to realize a projection-type image display device that is small in size, is easy to drive and control, and has high light use efficiency.

Note that the light diffusing element 402a and the light diffusing element 402b disposed in the fixed manner may be separate members or integrated members. When the light diffusing element 402a irradiated with the R beams (laser beams having a first wavelength) is set as a first diffusing region and the light diffusing element 402b irradiated with the B beams and the G beams (laser beams having a second wavelength) is set as a second diffusing region, since the first wavelength is larger than the second wavelength, it is preferable that the first diffusing region has a smaller diffusing power than the second diffusing region. In addition, the number of elements for the plurality of semiconductor lasers emitting light at the first wavelength (R) can be larger than the number of elements for the plurality of semiconductor lasers emitting light at the second wavelength (either B or G).

Ninth Embodiment

A ninth embodiment, which is a modification of the fifth embodiment, will be described with reference to FIG. 23. The description of matters common to the fifth embodiment will be simplified or omitted. In the fifth embodiment, as illustrated in FIG. 18, the single rotatable light diffusing element 402 is disposed in the vicinity of the incident surface of the rod integrator to dynamically diffuse B laser beams, G laser beams, and R laser beams, by using the laser module LM-BGR in which laser modules of three colors are integrated as a light source. Here, if the light diffusing element 402 is used for the purpose of suppressing the light intake loss on the incident surface INP of the rod integrator 403 focused on an improvement in utilization efficiency, it is not necessary to configure the diffusing surface to be movable. That is, the B laser beams, the G laser beams, and the R laser beams may be diffused statically rather than dynamically.

Figure 23:
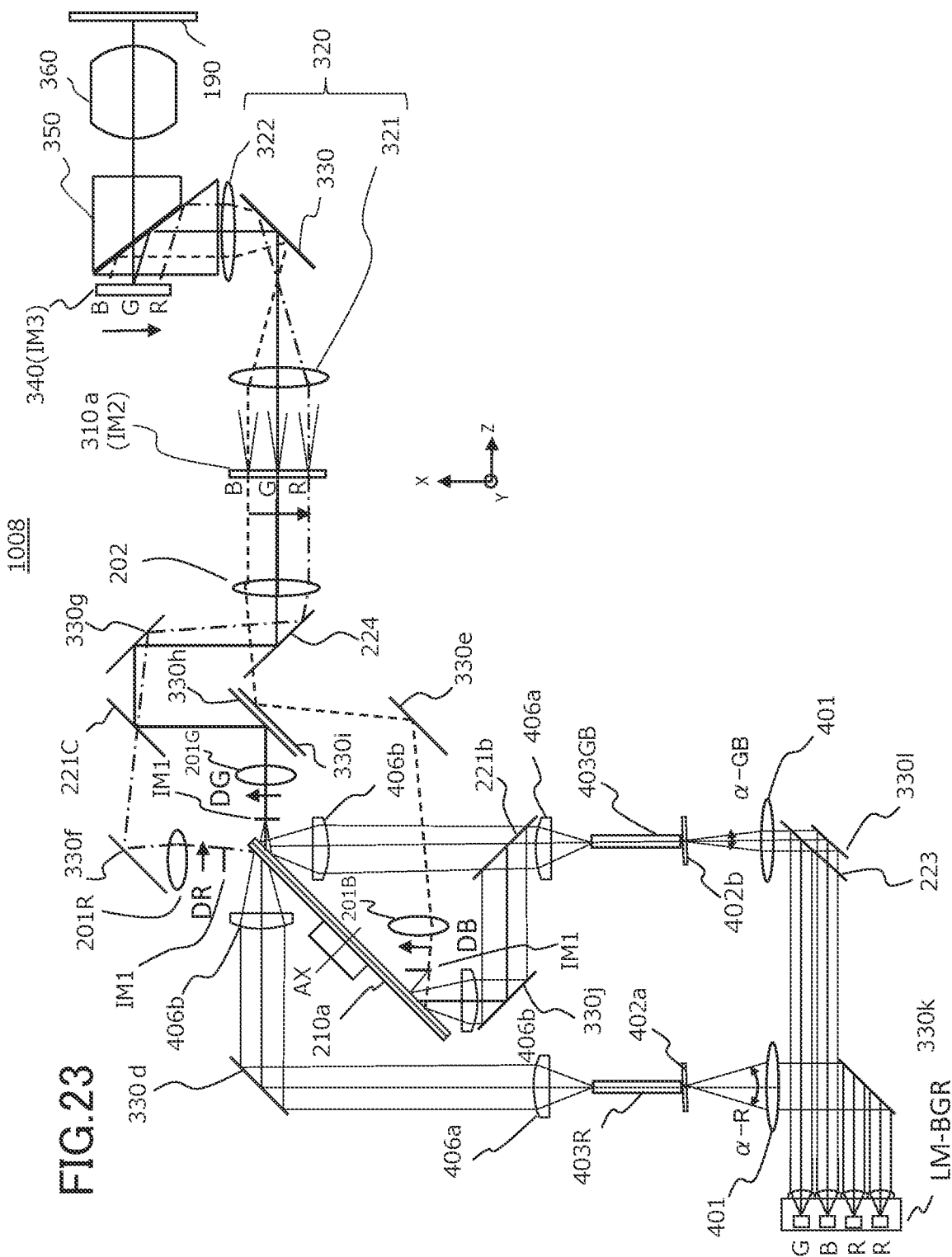
FIG. 23 is a diagram illustrating a schematic configuration of an optical system of a projection-type display device according to a ninth embodiment.

FIG. 23 illustrates an example of a projection-type image display device in which a light diffusing element 402a having a light diffusing surface having an area wider than the irradiation spot of laser beams R is fixedly disposed in the vicinity of the incident surface of the rod integrator 403R, and a light diffusing element 402b having a light diffusing surface having an area wider than any of the irradiation spots of laser beams G and laser beams B is fixedly disposed in the vicinity of the incident surface of the rod integrator 403GB. According to this embodiment, it is not necessary to install a drive mechanism (e.g., a motor) for dynamically moving the light diffusing elements, and as a result, it is possible to realize a projection-type image display device that is small in size, is easy to drive and control, and has high light use efficiency.

Note that the light diffusing element 402a and the light diffusing element 402b disposed in the fixed manner may be separate members or integrated members. When the light diffusing element 402a irradiated with the R beams (laser beams having a first wavelength) is set as a first diffusing region and the light diffusing element 402b irradiated with the B beams and the G beams (laser beams having a second wavelength) is set as a second diffusing region, since the first wavelength is larger than the second wavelength, it is preferable that the first diffusing region has a smaller diffusing power than the second diffusing region. In addition, the number of elements for the plurality of semiconductor lasers emitting light at the first wavelength (R) can be larger than the number of elements for the plurality of semiconductor lasers emitting light at the second wavelength (either B or G).

Tenth Embodiment

A tenth embodiment, which is a modification of the seventh embodiment, will be described with reference to FIG. 24. The description of matters common to the seventh embodiment will be simplified or omitted. In the seventh embodiment, as illustrated in FIG. 21, beams output from the laser module LM-B, the laser module LM-G, and the laser module LM-R are synthesized to be superimposed on each other in advance, and then are incident on the condenser lens 401 shared by B. G, and R to be condensed toward the light diffusing element 402. In the seventh embodiment, the single rotatable light diffusing element 402 is disposed in the vicinity of the incident surface of the single rod integrator 403. Here, if the light diffusing element 402 is used for the purpose of suppressing the light intake loss on the incident surface INP of the rod integrator 403 focused on an improvement in utilization efficiency, it is not necessary to configure the diffusing surface to be movable. That is, the B laser beams, the G laser beams, and the R laser beams superimposed on each other may be diffused statically rather than dynamically. Note that the number of elements for the plurality of semiconductor lasers emitting light at the first wavelength (R) can be larger than the number of elements for the plurality of semiconductor lasers emitting light at the second wavelength (either B or G).

Figure 24:
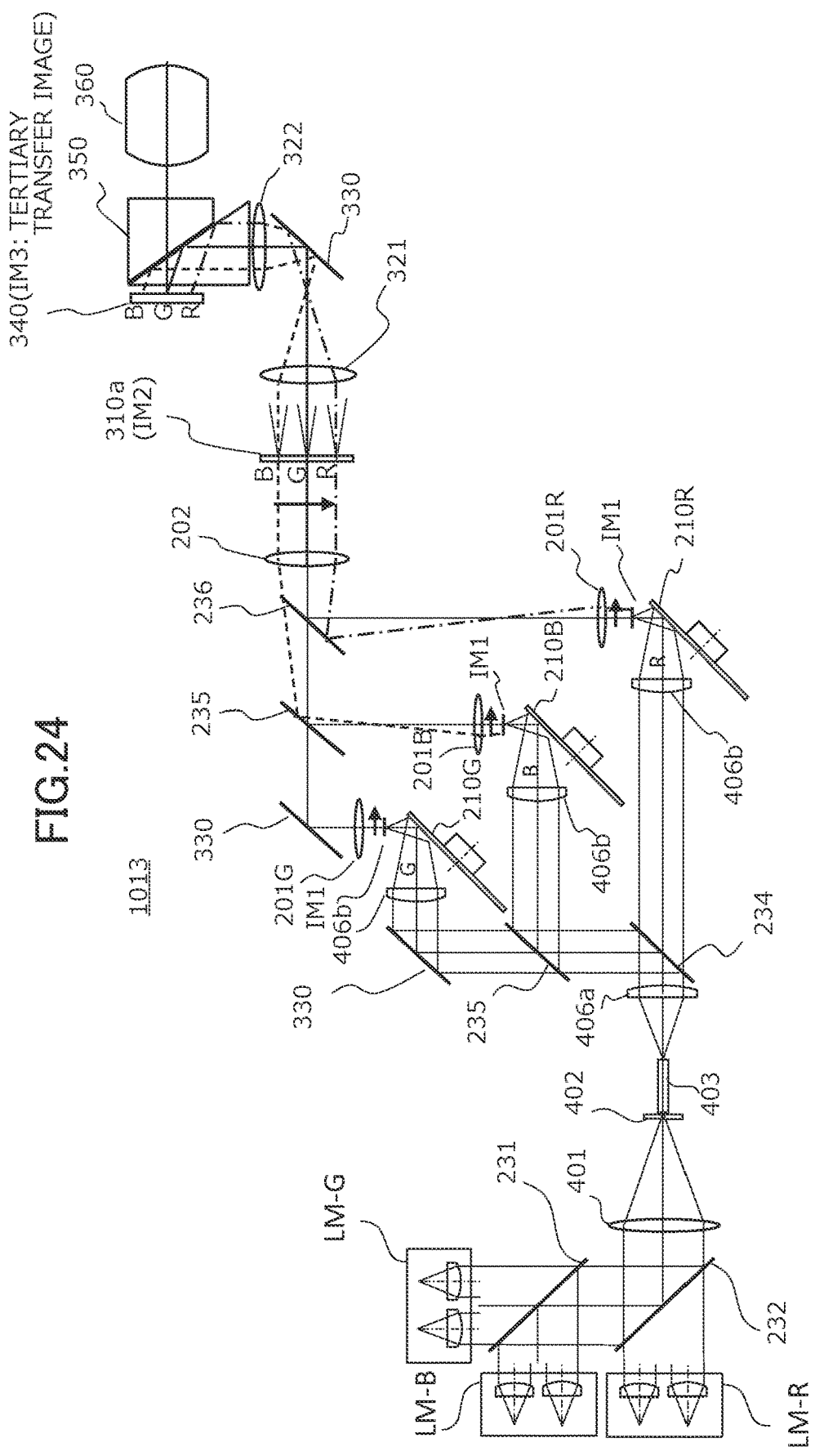
FIG. 24 is a diagram illustrating a schematic configuration of an optical system of a projection-type display device according to a tenth embodiment.

FIG. 24 illustrates an example of a projection-type image display device in which a light diffusing element 402 having a light diffusing surface having an area wider than any of the irradiation spots of laser beams of the respective colors is fixedly disposed in the vicinity of the incident surface of the rod integrator 403. According to this embodiment, it is not necessary to install a drive mechanism (e.g., a motor) for dynamically moving the light diffusing element, and as a result, it is possible to realize a projection-type image display device that is small in size, is easy to drive and control, and has high light use efficiency.

Figure 21:
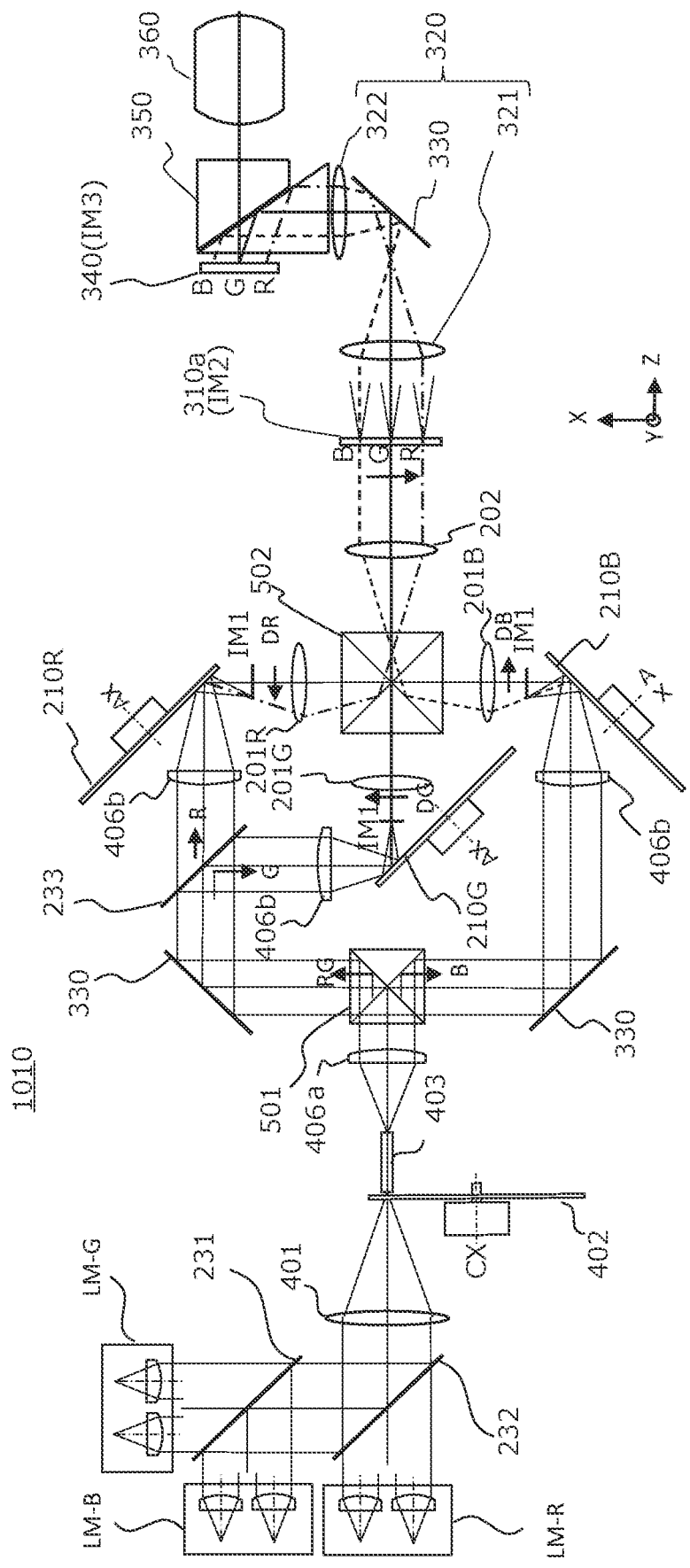
FIG. 21 is a diagram illustrating a schematic configuration of an optical system of a projection-type display device according to a seventh embodiment.

In the seventh embodiment, as illustrated in FIG. 21, after the B beams, the G beams, and the R beams emitted from the emission surface of the rod integrator 403 pass through the front convex lens 406a, which is a part of the relay lens, the beams of three colors are separated using the cross prism 501 and the dichroic mirror 233. In the present embodiment, as illustrated in FIG. 24, beams having passed through the front convex lens 406a are separated by color using a dichroic mirror 234 and a dichroic mirror 235. The dichroic mirror 234 has an optical characteristic of reflecting the B beams and the G beams and transmitting the R beams. The dichroic mirror 235 has an optical characteristic of reflecting B beams and transmitting G beams. After passing through the front convex lens 406a, the R beams are incident on the R deflector 210R with the number of time of reflection being 0, the B beams are reflected by the dichroic mirror 234 and the dichroic mirror 235 and are incident on the B deflector 210B with the number of times of reflection being 2, and the G beams are reflected by the dichroic mirror 234 and the optical path conversion mirror 330 and are incident on the G deflector 210G with the number of times of reflection being 2. Therefore, the direction in which the rectangular irradiation regions IM1 are scanned can be the same while the rotation directions of the R deflector 210R, the B deflector 210B, and the G deflector 210G are the same.

Further, when the beams of different colors deflected for scanning are synthesized, the beams are synthesized using the cross prism 502 as illustrated in FIG. 21 in the seventh embodiment, but the beams are synthesized using an optical path conversion mirror 330, a dichroic mirror 235, and a dichroic mirror 236 in the present embodiment. The dichroic mirror 235 has an optical characteristic of reflecting B beams and transmitting G beams. The dichroic mirror 236 has an optical characteristic of reflecting R beams and transmitting B beams and G beams. According to this configuration, the beams of different colors deflected for scanning by the deflectors are synthesized after all of the beams of different colors are subject to reflection once. According to the example of FIG. 24, it is not necessary to install two cross prisms as in the example of FIG. 21, and as a result, it is possible to realize a projection-type image display device that is small in size, is easy to drive and control, and has high light use efficiency.

Figure 25:
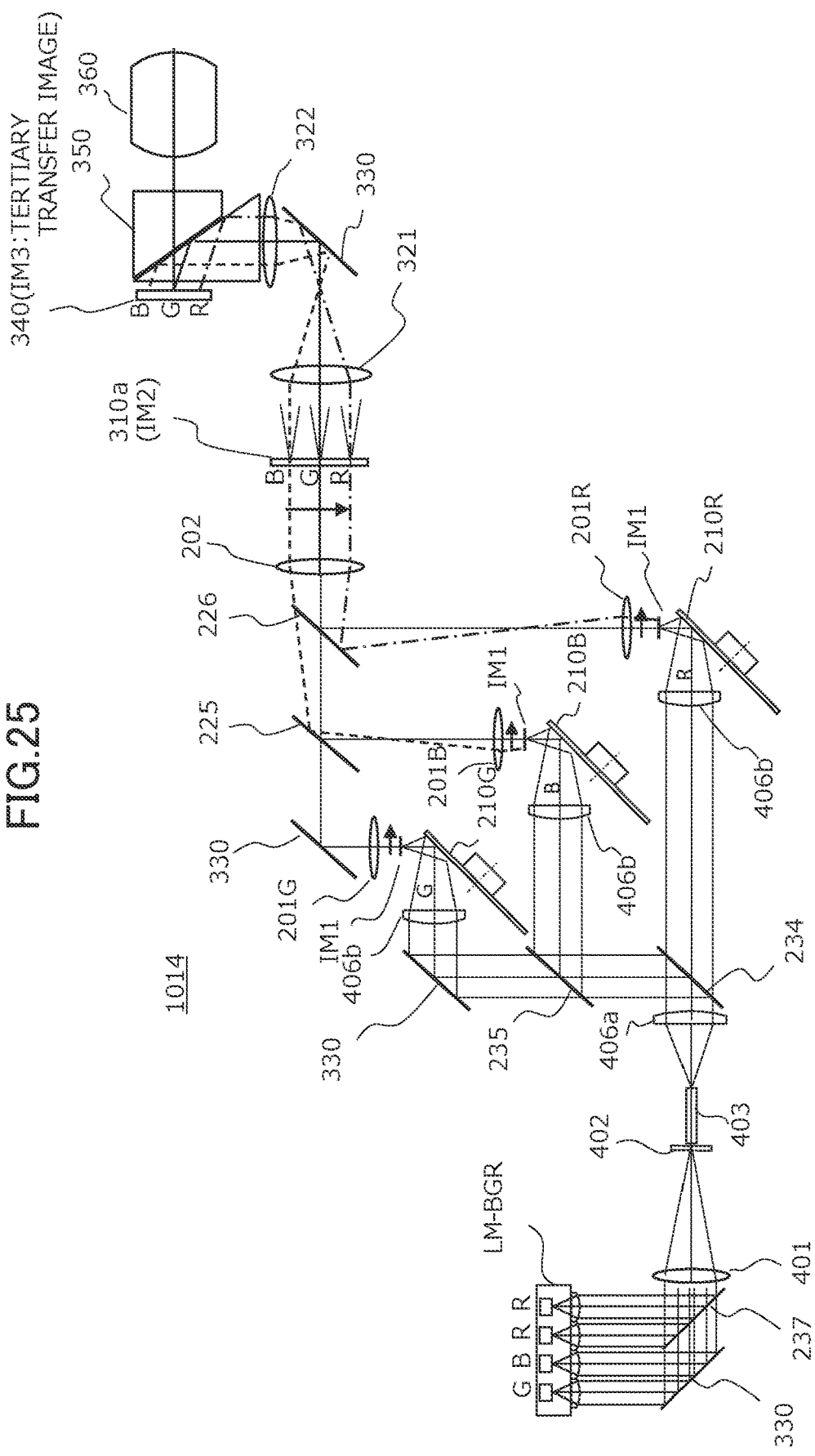
FIG. 25 is a diagram illustrating a schematic configuration of an optical system of a projection-type display device according to a modification of the tenth embodiment.

In the example illustrated in FIG. 24, the laser module LM-B, the laser module LM-G, and the laser module LM-R are individually laid out. However, as illustrated in FIG. 25, a laser module LM-BGR in which laser modules of three colors are integrated may be used. Note that the number of elements for the plurality of semiconductor lasers emitting light at the first wavelength (R) can be larger than the number of elements for the plurality of semiconductor lasers emitting light at the second wavelength (either B or G). The B beams, the G beams, and the R beams are synthesized by the optical path conversion mirror 330 and a dichroic mirror 237 having an optical characteristic of reflecting the R beams and transmitting the B beams and the G beams. According to this aspect, the portion corresponding to the light source can be compact.

OTHER EMBODIMENTS

Note that the present invention is not limited to the embodiments described above, and many modifications can be made within the technical spirit of the present invention. For example, the light diffusing element, the deflector, and the laser module may be replaced with elements used in different embodiments, or elements used in different embodiments may be combined to configure a projection-type display device.

Although it has been exemplified in the embodiments that the rod integrator 403 is configured in such a manner that the shape of the incident surface INP, the shape of the emission surface EXP, and the cross-sectional shape of the rod portion are the same, a rod having an incident surface INP and an emission surface EXP of which shapes are different, such as a so-called tapered rod, may be used.

In addition, the transfer optical systems used to transfer an image, that is, the first transfer lens (the front transfer lens 201 and the rear transfer lens 202), the second transfer optical system 320 (the front transfer lens 321 and the rear transfer lens 322), and the relay lens 406, are preferably configured such that both sides are telecentric, but other configurations may be used. As at least one of these transfer optical systems, for example, a so-called anamorphic optical system (anamorphic lens) having different optical characteristics between two cross sections around the optical axis may be adopted. If the first transfer lens, the second transfer optical system, the relay lens, and the like are anamorphic optical systems, the magnification in only one direction can be reduced or enlarged, and as a result, it is possible to adjust the NA and the aspect of the transfer image, thereby further improving light use efficiency.

In addition, the colors of beams from light sources for illumination are not limited to three colors of R, G, and B, and a light source having a wavelength different from those for these colors may be used. For example, a yellow light source may be added to use four colors. In addition, the integrator illumination systems used for the respective colors of light are not necessarily the same. Furthermore, depending on what the projection-type display device is used for, the projection-type display device may include only light sources of two colors of light having different wavelengths, for example, only R and G.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-186819, filed Nov. 22, 2022, and Japanese Patent Application No. 2023-60364, filed Apr. 3, 2023 which are hereby incorporated by reference herein in their entirety.

What is claimed is:

1. A projection-type display device comprising:
a first collimator lens configured to collimate a plurality of laser beams output from a plurality of semiconductor lasers that emits light at a first wavelength;
a first condenser lens configured to condense the plurality of laser beams collimated by the first collimator lens;
a second collimator lens configured to collimate a plurality of laser beams output from a plurality of semiconductor lasers that emits light at a second wavelength;
a second condenser lens configured to condense the plurality of laser beams collimated by the second collimator lens;
a light diffusing element including a light diffusing surface having an area wider than any of an irradiation spot of the laser beams of the first wavelength condensed by the first condenser lens and an irradiation spot of the laser beams of the second wavelength condensed by the second condenser lens;
a first integrator illumination system configured to superimpose the laser beams of the first wavelength diffused by the light diffusing surface to form a rectangular irradiation region for the first wavelength;
a second integrator illumination system configured to superimpose the laser beams of the second wavelength diffused by the light diffusing surface to form a rectangular irradiation region for the second wavelength;
a first deflection unit disposed at a side of the first integrator illumination system with respect to a position where the rectangular irradiation region for the first wavelength is formed by the first integrator illumination system;

a second deflection unit disposed at a side of the second integrator illumination system with respect to a position where the rectangular irradiation region for the second wavelength is formed by the second integrator illumination system;

a transfer optical system configured to transfer the rectangular irradiation region for the first wavelength deflection-scanned by the first deflection unit and the rectangular irradiation region for the second wavelength deflection-scanned by the second deflection unit in an enlarged manner to a reflective light modulation element; and a projection lens configured to project image light output from the reflective light modulation element.

2. The projection-type display device according to claim 1, wherein
the light diffusing element is configured to dynamically change a position of the irradiation spot of the laser beams of the first wavelength and a position of the irradiation spot of the laser beams of the second wavelength on the light diffusing surface by moving the light diffusing surface.

3. The projection-type display device according to claim 1, wherein
the light diffusing element includes the light diffusing surface formed along a circumference with a rotation axis at the center thereof, and the light diffusing surface is rotatable about the rotation axis.

4. The projection-type display device according to claim 1, wherein
the light diffusing element includes a light-transmissive substrate on which the light diffusing surface is formed, and a mechanism for rotating the substrate, moving the substrate in a zigzag manner, or linearly moving the substrate.

5. The projection-type display device according to claim 1, wherein
the light diffusing element includes a first diffusing region irradiated with the laser beams of the first wavelength and a second diffusing region irradiated with the laser beams of the second wavelength, the first wavelength is larger than the second wavelength, and the first diffusing region has a smaller diffusing power than the second diffusing region.

6. The projection-type display device according to claim 1, wherein
the light diffusing element includes a first diffusing region irradiated with the laser beams of the first wavelength and a second diffusing region irradiated with the laser beams of the second wavelength, and
a number of elements for the plurality of semiconductor lasers that emit light at the first wavelength is larger than a number of elements for the plurality of semiconductor lasers that emit light at the second wavelength, and the first diffusing region has a smaller diffusing power than the second diffusing region.

7. The projection-type display device according to claim 1, wherein
each of the first deflection unit and the second deflection unit includes an optical surface rotatable about a rotation axis and formed along a circumference with the rotation axis at the center thereof,
the optical surface is formed in such a manner that an inclination angle with respect to the rotation axis varies along the circumference, and
the inclination angle is formed in such a manner that if the optical surface is continuously rotated at a constant speed, the laser beams are recursively deflected in a constant direction at a constant deflection speed.

8. The projection-type display device according to claim 1, wherein
the first deflection unit and the second deflection unit are integrated,
each of the first deflection unit and the second deflection unit includes an optical surface rotatable about a common rotation axis and formed along a circumference with the rotation axis at the center thereof,
the optical surface is formed in such a manner that an inclination angle with respect to the rotation axis varies along the circumference, and
the inclination angle is formed in such a manner that if the optical surface is continuously rotated at a constant speed, the laser beams are recursively deflected in a constant direction at a constant deflection speed.

9. The projection-type display device according to claim 1, wherein
the plurality of semiconductor lasers that emit light at the first wavelength are arranged in such a manner that a slow-axis direction and a fast-axis direction are aligned with each other,
the slow-axis direction is a long-side direction of the rectangular irradiation region for the first wavelength,
the fast-axis direction is a short-side direction of the rectangular irradiation region for the first wavelength, and
the first deflection unit deflection-scans the rectangular irradiation region for the first wavelength along the short-side direction.

10. The projection-type display device according to claim 9, wherein
the plurality of semiconductor lasers that emit light at the second wavelength are arranged in such a manner that a slow-axis direction and a fast-axis direction are aligned with each other,
the slow-axis direction is a long-side direction of the rectangular irradiation region for the second wavelength,
the fast-axis direction is a short-side direction of the rectangular irradiation region for the second wavelength, and
the second deflection unit deflection-scans the rectangular irradiation region for the second wavelength along the short-side direction.

11. The projection-type display device according to claim 1, wherein
the first integrator illumination system and the second integrator illumination system include a rod on which laser beams transmitted through the light diffusing element are incident, and a relay lens configured to transfer an image from an emission surface of the rod.

12. The projection-type display device according to claim 11, wherein
the rod is a prism made of an optical material or a hollow tube of which an inner surface is a reflecting surface.

13. The projection-type display device according to claim 1, wherein
at least one of the first integrator illumination system, the second integrator illumination system, and the transfer optical system includes an anamorphic lens.

14. The projection-type display device according to claim 1, wherein
the transfer optical system includes:
a first transfer optical system configured to transfer the rectangular irradiation region for the first wavelength and the rectangular irradiation region for the second wavelength in an enlarged manner to a diffusion plate; and
a second transfer optical system configured to transfer an enlarged rectangular irradiation region for the first wavelength and an enlarged rectangular irradiation region for the second wavelength transferred to the diffusion plate in an enlarged manner to the reflective light modulation element.

15. The projection-type display device according to claim 1, further comprising:
a third collimator lens configured to collimate a plurality of laser beams output from a plurality of semiconductor lasers that emits light at a third wavelength; a third integrator illumination system; and a third deflection unit, wherein
the plurality of laser beams of the third wavelength collimated by the third collimator lens are condensed by the second condenser lens to be condensed toward the light diffusing element,
the laser beams of the third wavelength diffused by the light diffusing surface are superimposed by the third integrator illumination system to form a rectangular irradiation region for the third wavelength,
the third deflection unit is disposed at a side of the third integrator illumination system with respect to a position where the rectangular irradiation region for the third wavelength is formed by the third integrator illumination system, and
the transfer optical system transfers the rectangular irradiation region for the first wavelength deflection-scanned by the first deflection unit, the rectangular irradiation region for the second wavelength deflection-scanned by the second deflection unit, and the rectangular irradiation region for the third wavelength deflection-scanned by the third deflection unit in an enlarged manner to the reflective light modulation element.

16. A projection-type display device comprising:
a first collimator lens configured to collimate a plurality of laser beams output from a plurality of semiconductor lasers that emits light at a first wavelength;
a second collimator lens configured to collimate a plurality of laser beams output from a plurality of semiconductor lasers that emits light at a second wavelength;
a synthesis unit configured to synthesize the plurality of laser beams collimated by the first collimator lens and the plurality of laser beams collimated by the second collimator Jens in a superimposed manner;
a first condenser lens configured to condense the plurality of laser beams synthesized by the synthesis unit;
a light diffusing element including a light diffusing surface having an area wider than an irradiation spot of the plurality of laser beams condensed by the first condenser lens;
a first integrator illumination system configured to superimpose the laser beams of the first wavelength among the plurality of laser beams diffused by the light diffusing surface to form a rectangular irradiation region for the first wavelength;
a second integrator illumination system configured to superimpose the laser beams of the second wavelength among the plurality of laser beams diffused by the light diffusing surface to form a rectangular irradiation region for the second wavelength;
a first deflection unit disposed at a side of the first integrator illumination system with respect to a position where the rectangular irradiation region for the first wavelength is formed by the first integrator illumination system;
a second deflection unit disposed at a side of the second integrator illumination system with respect to a position where the rectangular irradiation region for the second wavelength is formed by the second integrator illumination system;
a transfer optical system configured to transfer the rectangular irradiation region for the first wavelength deflection-scanned by the first deflection unit and the rectangular irradiation region for the second wavelength deflection-scanned by the second deflection unit in an enlarged manner to a reflective light modulation element; and
a projection lens configured to project image light output from the reflective light modulation element, wherein
the first integrator illumination system and the second integrator illumination system share a rod on which the plurality of laser beams transmitted through the light diffusing surface are incident,
the first integrator illumination system includes a separation element configured to separate the laser beams of the first wavelength from the plurality of laser beams emitted from the rod, and a relay lens configured to transfer an image from an emission surface of the rod, and
the second integrator illumination system includes a separation element configured to separate the laser beams of the second wavelength from the plurality of laser beams emitted from the rod, and a relay lens configured to transfer an image from the emission surface of the rod.

17. The projection-type display device according to claim 16, wherein
the light diffusing element is configured to dynamically change a position of the irradiation spot of the plurality of laser beams on the light diffusing surface by moving the light diffusing surface.

18. The projection-type display device according to claim 16, wherein
the light diffusing element includes the light diffusing surface formed along a circumference with a rotation axis at the center thereof, and the light diffusing surface is rotatable about the rotation axis.

* * * * *